(12) United States Patent
Uesaka

(10) Patent No.: US 10,948,780 B2
(45) Date of Patent: Mar. 16, 2021

(54) LIQUID CRYSTAL ELEMENT AND METHOD OF PRODUCING THE SAME

(71) Applicant: JSR CORPORATION, Tokyo (JP)

(72) Inventor: Yuusuke Uesaka, Tokyo (JP)

(73) Assignee: JSR CORPORATION, Tokyo (JP)

( * ) Notice: Subject to any disclaimer, the term of this patent is extended or adjusted under 35 U.S.C. 154(b) by 188 days.

(21) Appl. No.: 15/713,711

(22) Filed: Sep. 25, 2017

(65) Prior Publication Data
US 2018/0086978 A1 Mar. 29, 2018

(30) Foreign Application Priority Data

Sep. 27, 2016 (JP) .............................. JP2016-188738

(51) Int. Cl.
*G02F 1/1337* (2006.01)
*C09K 19/14* (2006.01)
(Continued)

(52) U.S. Cl.
CPC .......... *G02F 1/1337* (2013.01); *C09K 19/061* (2013.01); *C09K 19/12* (2013.01);
(Continued)

(58) Field of Classification Search
CPC ......... Y10T 428/1005; Y10T 428/1023; G02F 1/1339; C09K 2019/123; C09K 2323/02; C09K 2323/027
See application file for complete search history.

(56) References Cited

U.S. PATENT DOCUMENTS

2012/0088040 A1* 4/2012 Matsumori ........ C08G 73/1042
428/1.26
2012/0249940 A1* 10/2012 Choi ................. G02F 1/133753
349/123
(Continued)

FOREIGN PATENT DOCUMENTS

| JP | 2010-285499 | 12/2010 |
| JP | 2012234178 | 11/2012 |
| JP | 2014-112192 | 6/2014 |

OTHER PUBLICATIONS

"Office Action of Japan Counterpart Application", dated Dec. 3, 2019, with English translation thereof, p. 1-p. 9.
(Continued)

*Primary Examiner* — Sophie Hon
(74) *Attorney, Agent, or Firm* — JCIPRNET

(57) ABSTRACT

A liquid crystal element includes a pair of substrates disposed to face each other, a liquid crystal layer disposed between the pair of substrates, and a liquid crystal alignment layer provided on each of the liquid crystal layer sides of the pair of substrates. The liquid crystal layer includes a compound having an alkenyl structure and a compound having a terphenyl ring structure, or includes a compound having an alkenyl structure and a terphenyl ring structure in the same molecule, and the liquid crystal alignment layer is a layer comprising a liquid crystal alignment agent containing a polymer (P) which has at least one selected from the group consisting of a radical polymerizable group, a photoinitiator group, a nitrogen-containing heterocyclic ring (excluding imide rings in polyimides), an amino group and a protected amino group.

4 Claims, 2 Drawing Sheets

(51) Int. Cl.
    *C09K 19/60*    (2006.01)
    *C09K 19/20*    (2006.01)
    *C09K 19/06*    (2006.01)
    *C09K 19/12*    (2006.01)
    *C09K 19/38*    (2006.01)
    *C09K 19/40*    (2006.01)
    *G02F 1/1333*   (2006.01)
    *G02F 1/1339*   (2006.01)
    *C09K 19/04*    (2006.01)
    *C09K 19/30*    (2006.01)

(52) U.S. Cl.
    CPC .......... *C09K 19/14* (2013.01); *C09K 19/2014* (2013.01); *C09K 19/2028* (2013.01); *C09K 19/3823* (2013.01); *C09K 19/408* (2013.01); *C09K 19/606* (2013.01); *G02F 1/1339* (2013.01); *G02F 1/133305* (2013.01); *G02F 1/133723* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2323/02* (2020.08); *C09K 2323/025* (2020.08); *C09K 2323/027* (2020.08)

(56) References Cited

U.S. PATENT DOCUMENTS

| | | | |
|---|---|---|---|
| 2013/0009176 A1* | 1/2013 | Kang | G02F 1/13394 257/88 |
| 2013/0183460 A1* | 7/2013 | Klasen-Memmer | C09K 19/322 428/1.4 |
| 2013/0321755 A1* | 12/2013 | Hsieh | C09K 19/32 349/183 |
| 2014/0226116 A1* | 8/2014 | Hayashi | G02F 1/133723 349/127 |
| 2015/0267118 A1* | 9/2015 | Park | C09K 19/3003 349/139 |
| 2017/0357131 A1* | 12/2017 | Chen | G02F 1/136286 |

OTHER PUBLICATIONS

"Office Action of Japan Counterpart Application", dated Jun. 2, 2020, with English translation thereof, p. 1-p. 2.

* cited by examiner

LIQUID CRYSTAL ELEMENT AND METHOD OF PRODUCING THE SAME

CROSS-REFERENCE TO RELATED APPLICATION

This application claims the priority benefits of Japanese patent application no. 2016-188738, filed on Sep. 27, 2016. The entirety of the above-mentioned patent application is hereby incorporated by reference herein and made a part of this specification.

BACKGROUND OF THE INVENTION

Field of the Invention

The present disclosure relates to a liquid crystal element and a method of producing the same.

Description of Related Art

In recent years, a polymer sustained alignment (PSA) mode has been proposed as a driving mode for controlling the alignment of liquid crystal molecules. The PSA mode is a technique of controlling the molecular alignment of the liquid crystal by polymerizing a photopolymerizable monomer by irradiating a liquid crystal cell with light in a state in which a voltage is applied between a pair of electrodes sandwiching a liquid crystal layer formed using a liquid crystal material after the photopolymerizable monomer is mixed into a liquid crystal material and the liquid crystal cell is assembled. According to this technique, there is an advantage in that the viewing angle is enlarged and high-speed response is achieved. Further, in recent years, higher response speed of PSA-type liquid crystal panels has been studied, and attempts to incorporate alkenyl-type liquid crystals into the liquid crystal layer have been made in such technology (for example, see Patent literature 1 and 2)

PRIOR ART DOCUMENT

Patent Documents

[Patent literature 1] Japanese Unexamined Patent Application Publication No. 2014-112192
[Patent literature 2] Japanese Unexamined Patent Application Publication No. 2010-285499

SUMMARY OF THE INVENTION

In the liquid crystal element, the demand for improvement in display quality has become intense, and the ability to display moving images quickly and precisely is also required more than ever before. For example, since a PSA-type liquid crystal element is used as a display device of a liquid crystal television or the like, there is great demand for high-speed response of the liquid crystal and reduction of so-called "afterimages" in which an image to be removed remains. From the viewpoint of further improvement of the quality of the liquid crystal element, it is required to obtain a liquid crystal element which is superior in response speed and is less likely to cause afterimages than a conventional liquid crystal element.

The present disclosure has been made in view of the above problems, and provides a liquid crystal element in which hardly any afterimages are caused and which has a high response speed of the liquid crystal.

According to the present disclosure, there are provided the following liquid crystal element and method of producing the liquid crystal element.

<1> A liquid crystal element, comprising: a pair of substrates disposed to face each other; a liquid crystal layer disposed between the pair of substrates; and a liquid crystal alignment layer provided on each of the liquid crystal layer sides of the pair of substrates, wherein the liquid crystal layer includes a compound having an alkenyl structure and a compound having a terphenyl ring structure, or includes a compound having an alkenyl structure and a terphenyl ring structure in the same molecule, and the liquid crystal alignment layer is a layer comprising a liquid crystal alignment agent containing a polymer (P) which has at least one selected from the group consisting of a radical polymerizable group, a photoinitiator group, a nitrogen-containing heterocyclic ring (excluding imide rings in polyimides), an amino group and a protected amino group.

<2> A method of producing a liquid crystal element, comprising: applying a liquid crystal alignment agent on a conductive film of a pair of substrates having the conductive film to form a coating film; forming a liquid crystal cell by arranging the pair of substrates on which the coating film is formed to face each other such that the coating films face each other with a liquid crystal layer interposed therebetween; and irradiating the liquid crystal cell with light in a state where a voltage is applied between the conductive films, wherein the liquid crystal layer includes a compound having an alkenyl structure and a compound having a terphenyl ring structure, or includes a compound having an alkenyl structure and a terphenyl ring structure in the same molecule, and the liquid crystal alignment agent contains a polymer (P) which has at least one functional group selected from the group consisting of a radical polymerizable group, a photoinitiator group, a nitrogen-containing heterocyclic ring (excluding imide rings in polyimides), an amino group and a protected amino group.

According to the liquid crystal element in which the liquid crystal layer contains a compound having an alkenyl structure and a compound having a terphenyl ring structure or contains a compound having an alkenyl structure and a terphenyl ring structure in the same molecule, and includes the liquid crystal alignment layer having the polymer (P) with a specific partial structure, a liquid crystal element in which hardly any afterimages occur and the response speed of a liquid crystal is high can be obtained.

DESCRIPTION OF THE EMBODIMENTS

Figure 1:
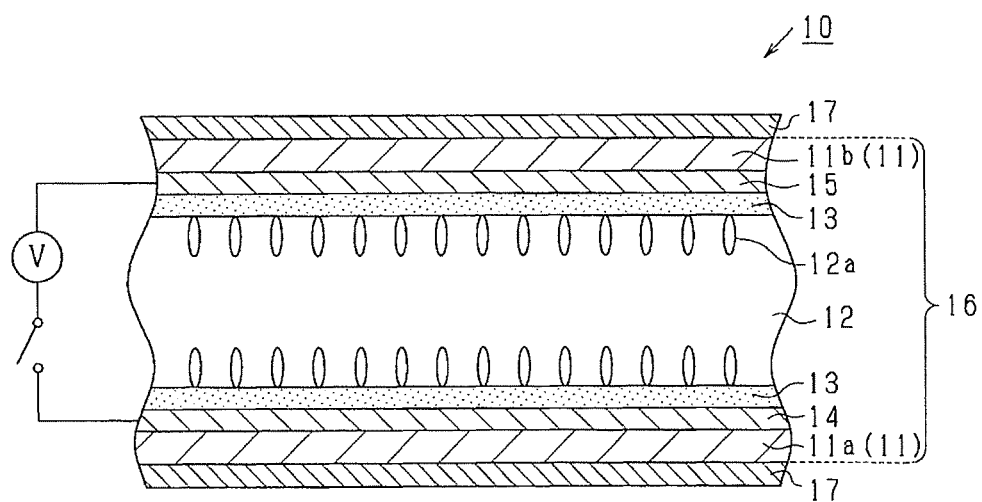
FIG. 1 is a schematic configuration diagram of a liquid crystal element.

Hereinafter, a liquid crystal element and a method of producing the same according to the present embodiment will be described with reference to the drawings. As shown in FIG. 1, a liquid crystal element 10 includes a pair of substrates 11 disposed to face each other, a liquid crystal layer 12 disposed between the pair of substrates 11, and a liquid crystal alignment layer 13 provided on each of the liquid crystal layer 12 sides of the pair of substrates.

For example, the pair of substrates 11 is formed of a material such as glass, silicon, polyethylene terephthalate, polybutylene terephthalate, polyether sulfone, polycarbonate, polypropylene, polyvinyl chloride, an aromatic polyamide, polyamide imide, polyimide, triacetyl cellulose (TAC), polymethyl methacrylate, etc. The thickness of each substrate is arbitrary, and may be, for example, 0.001 μm to 1 mm.

On one substrate 11a of the pair of substrates 11, a pixel electrode 14 comprising a transparent conductive film such as indium tin oxide (ITO), various wirings such as scanning lines and signal lines, a thin film transistor (TFT) as a switching element, a flattening film and the like are provided. Furthermore, on the other substrate 11b, a common electrode 15 comprising a transparent conductive film such as ITO, a color filter, a light shielding layer, an overcoat layer and the like are provided. Further, the pixel electrode 14 and the common electrode 15 are a pair of electrodes. A desired pattern may be formed on the pixel electrode 14 and the common electrode 15. A spacer (not shown) for maintaining a cell gap between the substrates is provided between the substrates 11a and 11b. In the present embodiment, a so-called black column spacer imparted with a light shielding property by a light shielding agent such as carbon black or the like is used as a spacer. Further, for example, a bead spacer or the like may be used instead of a black column spacer.

In the pair of substrates 11, liquid crystal alignment layers 13 are formed on each of the pixel electrode 14 and the common electrode 15. The liquid crystal alignment layer 13 is an organic thin film for controlling the alignment of liquid crystal molecules 12a in the liquid crystal layer 12 and is formed using a liquid crystal alignment agent which is a polymer composition containing a polymer component. The thickness of the liquid crystal alignment layer 13 is preferably 0.001 to 1 μm, and more preferably 0.005 to 0.5 μm.

The liquid crystal layer 12 is disposed in contact with the liquid crystal alignment layers 13, and the alignment state of the liquid crystal molecules 12a in the liquid crystal layer 12 changes by applying a voltage between the conductive films 14. Examples of the liquid crystal include nematic liquid crystals and smectic liquid crystals, among which nematic liquid crystals are preferred. Furthermore, for example, cholesteric liquid crystals, a chiral agent, ferroelectric liquid crystals or the like may be added to the above-described liquid crystals. The thickness of the liquid crystal layer 12 is preferably 1 to 5 μm.

A layer in which the alignment of the liquid crystal molecules 12a is controlled is formed at the interface part with respect to the liquid crystal alignment layer 13 in the liquid crystal layer 12, such that the alignment of the liquid crystal molecules 12a in a state where a voltage is applied between the pair of electrodes is maintained even after the voltage application is stopped. The above-described layer of the interface part is formed by polymerizing a radical polymerizable component contained in the liquid crystal layer 12 in a state where a voltage is applied between the pair of electrodes after the liquid crystal cell 16 is formed. The liquid crystal layer 12 contains a compound having an alkenyl structure (hereinafter, also referred to as an "alkenyl compound") and a compound having a terphenyl ring structure (hereinafter, also referred to as a "terphenyl compound"). Further, a compound having an alkenyl structure and a terphenyl ring structure in the same molecule may be contained in the liquid crystal layer 12 instead of including the alkenyl compound and the terphenyl compound in the liquid crystal layer 12, or in combination with these compounds.

A polarizing layer 17 is disposed on the outer surface of each substrate in the pair of substrates 11. The polarizing layer 17 may be a polarizing film in which a polarizing film called an "H film" obtained by absorbing iodine into polyvinyl alcohol while stretching and orienting polyvinyl alcohol is sandwiched between cellulose acetate protective films, or a polarizing film comprising the H film itself.

Next, a method of producing the liquid crystal element 10 will be described. The liquid crystal element 10 is produced by a method including step A of applying a liquid crystal alignment agent on each of conductive films (pixel electrode 14 and common electrode 15) of the pair of substrates 11 to form a coating film; step B of forming a liquid crystal cell 16 by arranging the pair of substrates 11 on which the coating films are formed to face each other such that the coating films face each other with the liquid crystal layer 12 interposed therebetween; and step C of irradiating the formed liquid crystal cell 16 with light.

In step A, for example, application of a liquid crystal alignment agent to the substrate is carried out by applying a solution on a surface of each electrode of the pair of substrates 11 using a known coating method such as an offset printing method, a spin coating method, a roll coater method, an ink jet printing method, a bar coater method, etc. Preheating (pre-baking) is preferably performed for the purpose of preventing dripping of the applied liquid crystal alignment agent after the liquid crystal alignment agent is applied. The prebaking temperature at this time is set according to the type of substrate, but is preferably 30 to 200° C., and the prebaking time is preferably 0.25 to 10 minutes. Thereafter, it is preferable to carry out a calcination (post-baking) process for the purpose of completely removing a solvent and thermally imidizing an amic acid structure present in the polymer if necessary. The calcination temperature (post-bake temperature) at this time is preferably 80 to 300° C., and the post bake time is preferably 5 to 200 minutes.

Further, for example, an alignment ability imparting treatment such as a rubbing treatment in which a coating film is rubbed in a certain direction with a roll wrapped with a cloth comprising fibers such as nylon, rayon, cotton or the like, a photo-alignment treatment of irradiating the coating film with polarized or non-polarized radiation, or the like may be performed on the coating film formed above.

In Step B, two substrates each having a liquid crystal alignment film or a coating film to be a liquid crystal alignment film formed thereon are prepared, and a liquid crystal layer 12 is disposed between two substrates 11a and 11b facing each other, and thereby the liquid crystal cell 16 is produced. Specifically, a method in which the periphery of the pair of substrates 11 are bonded with a sealing agent after disposing a spacer between the substrates if necessary, a liquid crystal composition is injected and filled into a cell gap defined by a substrate surface and the sealing agent, and an injection hole is sealed; a method (ODF method) in which a sealing agent is applied to the periphery of the liquid crystal alignment film side of one of the pair of substrates 11, a spacer is disposed between the substrates if necessary, the liquid crystal composition is dropped on several predetermined places on the surface of the liquid crystal alignment film (liquid crystal alignment layer 13), the other substrate is bonded thereto such that the liquid crystal alignment films face each other, and the liquid crystal composition is spread over the entire surface of the substrate, and then the sealing agent is cured and the like may be used. For example, an epoxy resin or the like may be used as the sealing agent. Aluminum oxide spheres or the like as a spacer may be contained in the sealing agent.

In step C, the liquid crystal cell 16 is irradiated with light after the liquid crystal cell 16 is formed. As the light with which the liquid crystal cell 16 is irradiated, for example, ultraviolet rays and visible light including light having a wavelength of 150 to 800 nm may be used, but ultraviolet rays including light having a wavelength of 300 to 400 nm are preferred. Examples of a light source of the irradiation light include a low pressure mercury lamp, a high pressure (meth)acrylate, cyclohexyl (meth)acrylate, benzyl (meth)acrylate, 2-methoxyethyl (meth)acrylate, methoxytriethylene glycol (meth)acrylate, glycidyl (meth)acrylate and 2-hydroxyethyl (meth)acrylate; a polyfunctional (meth)acrylate such as ethylene glycol di(meth)acrylate, 1,6-hexanediol di(meth)acrylate, pentaerythritol tri(meth)acrylate, polyether (meth)acrylate, ethoxylated bisphenol A di(meth)acrylate, a compound represented by each of the following Formulas (B1-1) to (B1-3), a terphenyl compound represented by each of the following Formulas (2-7) to (2-10); and a polyorganosiloxane having a (meth)acryloyl group in the side chain, etc.

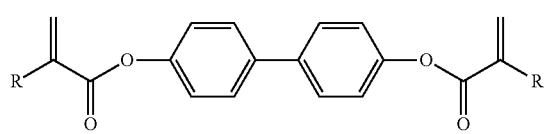

(B1-1)

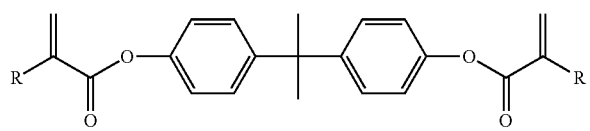

(B1-2)

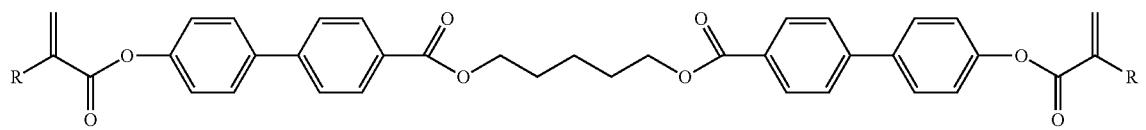

(B1-3)

mercury lamp, a deuterium lamp, a metal halide lamp, an argon resonance lamp, a xenon lamp, an excimer laser, etc. The irradiation amount of light is preferably 1,000 to 200,000 J/m$^2$, and more preferably 1,000 to 100,000 J/m$^2$. Light irradiation on the liquid crystal cell 16 may be performed in a state in which no voltage is applied between the conductive films or in a state in which a predetermined voltage by which the liquid crystal molecules 12a of the liquid crystal layer 12 are not driven is applied, or light irradiation may be performed in a state in which a predetermined voltage by which the liquid crystal molecules 12a can be driven is applied between the conductive films. Among these, it is preferable to perform light irradiation in a state in which a voltage is applied between the conductive films. Thereafter, a polarizing plate is attached to the outer surface of the obtained liquid crystal cell 16 to form a polarizing layer 17. Accordingly, a liquid crystal element 10 is obtained.

When the treatment of Step C is performed, it is preferable to form the liquid crystal layer 12 using a liquid crystal composition containing a component having a radical polymerizable group (hereinafter, also referred to as a "radical polymerizable component"). The radical polymerizable group of the component is not particularly limited as long as it is a functional group capable of radical polymerization, and examples thereof include a (meth)acryloyl group, a vinyl group, an allyl group, a styrene group, a maleimide group, a vinyloxy group, an ethynyl group, etc.

The radical polymerizable component is preferably polyfunctional, and a compound having at least two in total of at least one of an acryloyl group and a methacryloyl group is more preferred in view of high polymerizability. Specific examples of the radical polymerizable component include a monofunctional (meth)acrylate such as methyl (meth)acrylate, ethyl (meth)acrylate, butyl (meth)acrylate, lauryl (In Formulas (B1-1) to (B1-3), R represents a hydrogen atom or a methyl group.)

It is preferable to use a compound having a mesogen skeleton as the radical polymerizable component from the viewpoint of stably maintaining the alignment properties of the liquid crystal. Further, the radical polymerizable component may be a terphenyl compound. The proportion of the radical polymerizable component is preferably 0.1 to 0.5 mass % with respect to the total amount of the liquid crystal composition used for forming the liquid crystal layer 12.

(Alkenyl Compound and Terphenyl Compound)

Next, the alkenyl compound and the terphenyl compound will be explained.

The alkenyl compound in the present disclosure is preferably a compound having a partial structure represented by the following Formula (1).

$$*-A^1-(X^1)_n \tag{1}$$

(In Formula (1), $A^1$ is an (n+1)-valent alicyclic group, $X^1$ is a group having an alkenyl structure, and n is an integer of 1 to 3. "*" represents a bonding position.)

Examples of $A^1$ in Formula (1) include a divalent organic group or the like generated by losing (n+1) hydrogen atoms from an aliphatic ring such as a cyclopentane ring, a cyclohexane ring, a cycloheptane ring, a cyclohexene ring, etc. For example, a substituent such as a fluorine atom, a methyl group, an ethyl group and the like may be introduced into the ring portion of $A^1$.

Examples of the alkenyl structure of $X^1$ include a monovalent hydrocarbon group formed by losing one hydrogen atom from an aliphatic hydrocarbon having a double bond and a group in which at least one hydrogen atom of the hydrocarbon group is substituted with a fluorine atom. n is preferably 1 or 2, and is more preferably 1.

The alkenyl compound preferably exhibits liquid crystallinity, and specifically includes, for example, a compound represented by each of the following Formulas (L1-1) to (L1-11). Further, an alkenyl compound may be used as one type alone or two or more types thereof may be used in combination.

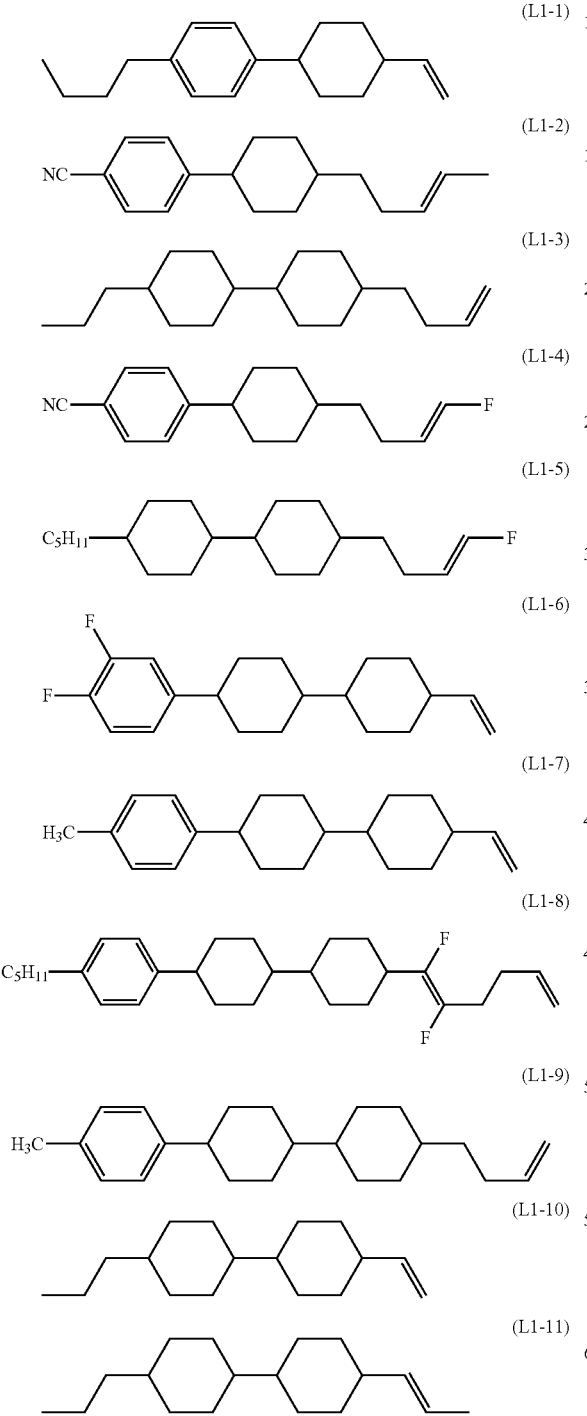

The terphenyl compound preferably has a p-terphenyl ring structure, and examples thereof include a compound represented by the following Formula (2).

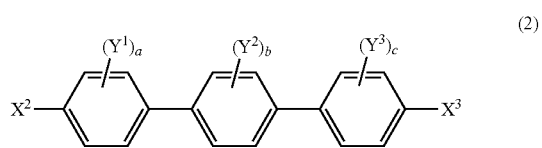

(In Formula (2), $X^2$, $X^3$ and $Y^1$ to $Y^3$ each independently represent a halogen atom, a cyano group or a monovalent organic group having 1 to 10 carbon atoms, and a, b and c each independently represent an integer of 0 to 4.)

In Formula (2), examples of the monovalent organic group for $X^2$ and $X^3$ include a group having an alkyl group having 1 to 10 carbon atoms, an alkoxy group, a fluoroalkyl group, a fluoroalkoxy group, and a radical polymerizable group, etc. Examples of the monovalent organic group for $Y^1$ to $Y^3$ include an alkyl group having 1 to 10 carbon atoms, an alkoxy group, a fluoroalkyl group, and a fluoroalkoxy group, etc. Examples of the halogen atom for $X^2$, $X^3$ and $Y^1$ to $Y^3$ include a fluorine atom, a chlorine atom, a bromine atom, an iodine atom and the like, and a fluorine atom is preferred. a, b and c are preferably integers of 0 to 2.

The terphenyl compound preferably exhibits liquid crystallinity. Specific examples of the terphenyl compound include compounds represented by each of the following Formulas (2-1) to (2-10), and the like. Further, a terphenyl compound may be used as one type alone or two or more types thereof may be used in combination.

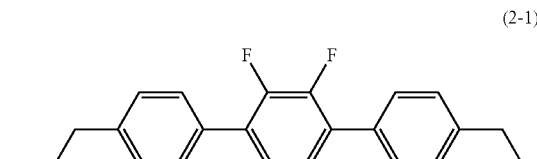

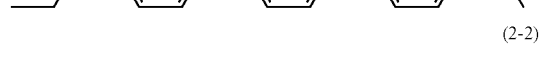

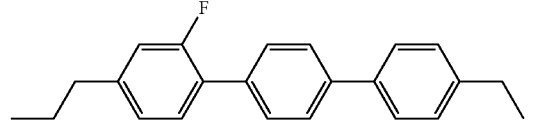

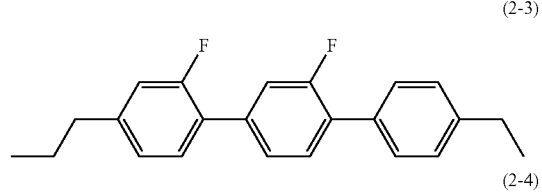

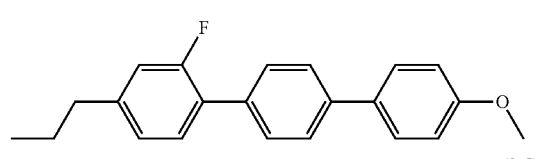

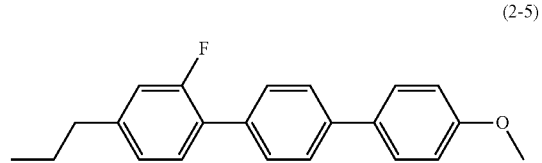

-continued (2-6)
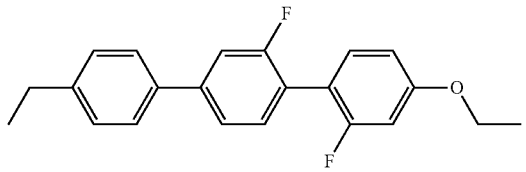

(2-7)
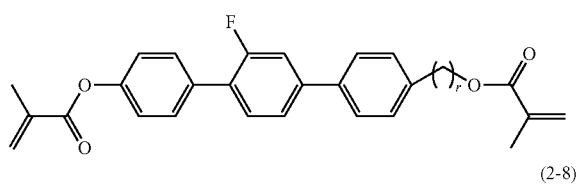

(2-8)
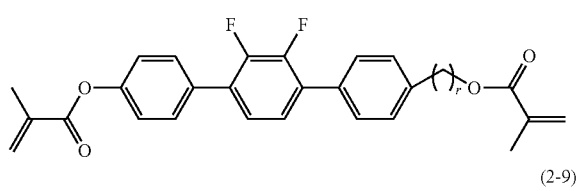

(2-9)
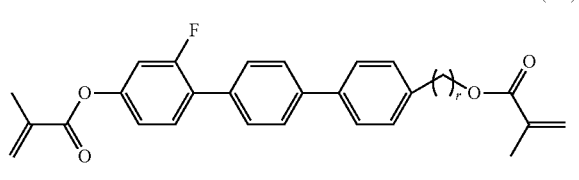

(2-10)
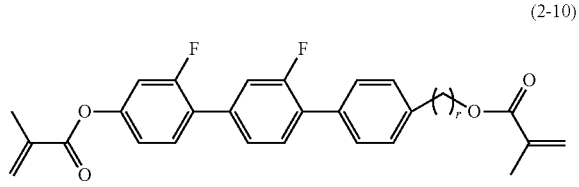

(In Formulas (2-7) to (2-10), r is an integer of 0 to 10.)

The liquid crystal layer 12 may contain other liquid crystalline compounds other than the alkenyl compound and the terphenyl compound. Examples of the other liquid crystalline compounds include dicyanobenzene-based liquid crystals, pyridazine-based liquid crystals, Schiff base-based liquid crystals, azoxy-based liquid crystals, biphenyl-based liquid crystals, phenylcyclohexane-based liquid crystals, etc.

The content of the alkenyl compound is preferably 1 to 80 mass %, and more preferably 2 to 60 mass % based on the total amount of constituent components of the liquid crystal layer 12. Furthermore, the content of the terphenyl compound is preferably 0.1 to 10% by mass, and more preferably 0.3 to 8% by mass based on the total amount of the constituent components of the liquid crystal layer 12.

The liquid crystal element 10 of the present embodiment has a black column spacer in the liquid crystal layer 12. In a liquid crystal panel in a complicated shape such as a curved display, a black column spacer may be used to suppress light leakage due to substrate misalignment at the curved end. On the other hand, in a liquid crystal element having a black column spacer, afterimages may easily occur or the response speed of the liquid crystal may be lowered. One reason for this is conceived to be the influence of elution of a light shielding agent in the black column spacer. In this respect, the liquid crystal element 10 including compounds having an alkenyl structure and a terphenyl ring structure in the same molecule or different molecules in the liquid crystal layer 12 and having a liquid crystal alignment film formed using a liquid crystal alignment agent containing the polymer (P) is preferred in that hardly any afterimages occur and the response speed of the liquid crystal is high even in a configuration having a black column spacer.

For example, the black column spacer may be formed by a photolithography method using a radiation sensitive resin composition. Known materials may be used as the radiation sensitive resin composition for the spacer, and for example, the radiation sensitive resin composition for the spacer may be prepared by appropriately selecting and mixing together a binder polymer, a photopolymerization initiator, a light shielding agent and the like as described in Japanese Unexamined Patent Application, First Publication No. 2015-069181. Regarding the type and proportion of each component to be mixed into the radiation sensitive resin composition for the spacer, a method of forming the spacer and the like, for example, the description of Japanese Unexamined Patent Application, First Publication No. 2015-069181 may be applied.

Here, examples of the light shielding agent include a perylene-based pigment, carbon black, a Pigment Blue (a compound classified as a Pigment Blue in the Color Index (C. I., published by The Society of Dyers and Colourists)), a lactam-based pigment, etc. As specific examples thereof, examples of the perylene-based pigment include compounds represented by the following Formulas (D1) and (D2).

(D1)
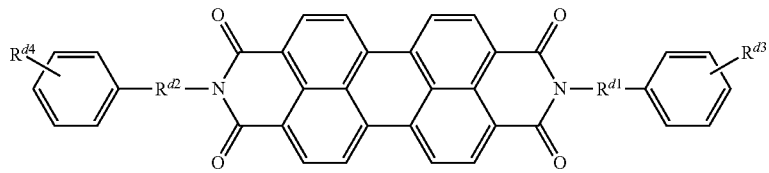

(In Formula (D1), $R^{d1}$ and $R^{d2}$ each independently represent an alkanediyl group having 1 to 3 carbon atoms, and $R^{d3}$ and $R^{d4}$ each independently represent a hydrogen atom, a hydroxyl group, a methoxy group or an acetyl group.)

(D2)
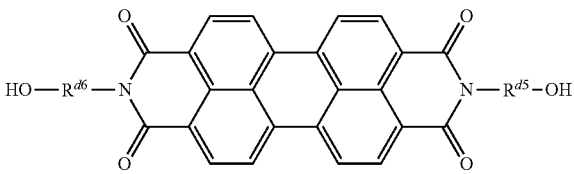

(In Formula (D2), $R^{d5}$ and $R^{d6}$ each independently represent an alkanediyl group having 1 to 7 carbon atoms.)

Commercially available products thereof include product names K0084 and K0086 manufactured by BASF, Pigment Black 31, 32, etc.

Examples of the carbon black include furnace black such as SAF, SAF-HS, ISAF, ISAF-LS, ISAF-HS, HAF, HAF-LS, HAF-HS, NAF, FEF, FEF-HS, SRF, SRF-LM, SRF-LS, GPF, ECF, N-339 and N-351; thermal black such as FT and MT; acetylene black, C.I. Pigment Black 7, etc.;

examples of the Pigment Blue include C.I. Pigment Blue 15, C.I. Pigment Blue 15:3, C.I. Pigment Blue 15:4, C.I. Pigment Blue 15:6, C.I. Pigment Blue 60, C.I. Pigment Blue 80, etc.; and examples of the lactam-based pigment include compounds represented by the following Formulas (4) and (5) and the like.

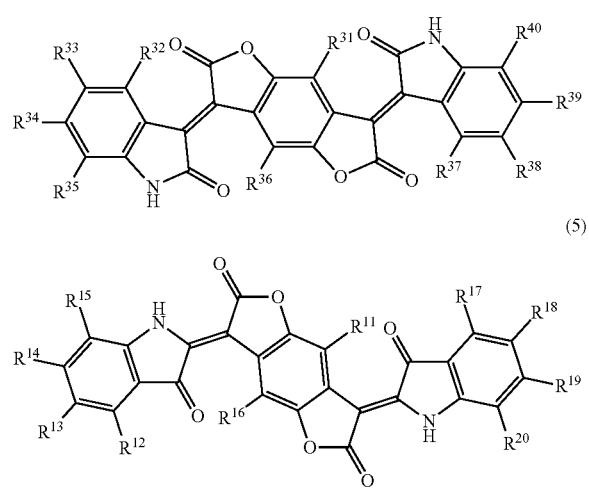

(4)

(5)

(In Formulas (4) and (5), $R^{31}$, $R^{36}$, $R^{11}$ and $R^{16}$ each independently represent a hydrogen atom, a halogen atom, an alkyl group having 1 to 6 carbon atoms or a fluorinated alkyl group having 1 to 6 carbon atoms. $R^{32}$ to $R^{35}$, $R^{37}$ to $R^{40}$, $R^{12}$ to $R^{15}$ and $R^{17}$ to $R^{20}$ each independently represent a hydrogen atom, a halogen atom or a group represented by $R^{21}$, COOH, COOR$^{21}$, COO—, CONH$_2$, CONHR$^{21}$, CONR$^{21}$R$^{22}$, CN, OH, OR$^{21}$, OCOR$^{21}$, OCONH$_2$, OCONHR$^{21}$, OCONR$^{21}$R$^{22}$, NO$_2$, NH$_2$, NHR$^{21}$, NR$^{21}$R$^{22}$, NHCOR$^{21}$, NR$^{21}$COR$^2$, N=CH$_2$, N=CHR$^{21}$, N=CR$^{21}$R$^{22}$, SH, SR$^{21}$, SOR$^{21}$, SO$_2$R$^{21}$, SO$_3$R$^{21}$, SO$_3$H, SO$_3^-$, SO$_2$NH$_2$, SO$_2$NHR$^{21}$ or SO$_2$NR$^{21}$R$^{22}$. The groups bonded to each of adjacent carbon atoms of $R^{32}$ to $R^{35}$, $R^{37}$ to $R^{40}$, $R^{12}$ to $R^{15}$, and $R^{17}$ to $R^{20}$ may be bonded to each other directly or via —O—, —S—, —NH— or —NR$^{21}$—, and may form a ring structure together with the carbon atoms to which they are bonded.

$R^{21}$ and $R^{22}$ each independently represent an alkyl group having 1 to 12 carbon atoms, a cycloalkyl group having 3 to 12 carbon atoms, an alkenyl group having 2 to 12 carbon atoms, a cycloalkenyl group having 4 to 12 carbon atoms or an alkynyl group having 2 to 12 carbon atoms, or a group in which —O—, —NH—, —NR$^{23}$— or —S— is interposed between the carbon-carbon bonds of the above-described groups. Here, some or all of the hydrogen atoms of the alkyl group, cycloalkyl group, alkenyl group, cycloalkenyl group and alkynyl group may be substituted with a halogen atom, a group represented by COOH, COOR$^{23}$, COO, CONH$_2$, CONHR$^{23}$, CONR$^{23}$R$^{24}$, CN, =O, OH, OR$^{23}$, OCOR$^{23}$, OCONH$_2$, OCONHR$^{23}$, OCONR$^{23}$R$^{24}$, =NR$^{23}$, NH$_2$, NHR$^{23}$, NR$^{23}$R$^{24}$, NHCOR$^{24}$, NR$^{23}$COR$^{24}$, N=CH$_2$, N=CHR$^2$, N=CR$^{23}$R$^{24}$, SH, SR$^{23}$, SOR$^{23}$, SO$_2$R$^{23}$, SO$_3$R$^{23}$, SO$_3$H, SO$_3$, SO$_2$NH$_2$, SO$_2$NHR$^{23}$ or SO$_2$NR$^{23}$R$^{24}$, an aralkyl group having 7 to 12 carbon atoms, a heteroaryl group having 1 to 11 carbon atoms or an aryl group having 6 to 12 carbon atoms. Some or all of the hydrogen atoms of the aralkyl group, heteroaryl group and aryl group may be substituted with a halogen atom or a group represented by COOH, COOR$^2$, COO$^-$, CONH$_2$, CONHR$^{23}$, CONR$^{23}$R$^{24}$, CN, OH, OR$^{23}$, OCOR$^{23}$, OCONH$_2$, OCONHR$^{23}$, OCONR$^{23}$R$^{24}$, NO$_2$, NH$_2$, NHR$^2$, NR$^{23}$R$^{24}$, NHCOR$^{24}$, NR$^{23}$COR$^{24}$, N=CH$_2$, N=CHR$^{23}$, N=CR$^{23}$R$^{24}$, SH, SR$^{23}$, SOR$^{23}$, SO$_2$R$^{23}$, SO$_3$R$^{23}$, SO$_3$H, SO$_3$, SO$_2$NH$_2$, SO$_2$NHR$^2$ or SO$_2$NR$^{23}$R$^{24}$.

$R^{23}$ and $R^{24}$ are each independently an alkyl group having 1 to 6 carbon atoms, a benzyl group or a phenyl group, and $R^{23}$ and $R^{24}$ may be bonded to each other directly or via —O—, —S—, —NH— or —NR$^{25}$—, and may form a ring structure together with the atoms to which they are bonded. $R^{25}$ is a monovalent organic group.)

Moreover, other chromatic coloring agents of two or more types may be used in combination as the light shielding agent. The perylene-based pigment, carbon black, Pigment Blue and lactam-based pigment may also be used in combination with other chromatic coloring agents.

Among these, when a liquid crystal element has a black column spacer containing a Pigment Blue or a lactam-based pigment as a light shielding agent, this is preferable because of effectiveness in reducing afterimages and improving the response speed.

Next, the liquid crystal alignment agent used for forming the liquid crystal alignment film will be described. The liquid crystal alignment agent is a polymer composition containing a polymer component and other components arbitrarily mixed together if necessary.

(Polymer (P))

The liquid crystal alignment agent of the present disclosure includes the polymer (P) having at least one selected from the group consisting of a radical polymerizable group, a photoinitiator group, a nitrogen-containing heterocyclic ring (excluding imide rings in polyimides), an amino group and a protected amino group (hereinafter, also referred to as a "specific partial structure").

Examples of the radical polymerizable group include a (meth)acryloyl group, a vinyl group, an allyl group, a styrene group, a maleimide group, a vinyloxy group, an ethynyl group, etc. Among these, a (meth)acryloyl group is particularly preferred from the viewpoint of high reactivity.

The photoinitiator group is a moiety initiating polymerization by light or having a photosensitizing action, and is a group having a structure derived from a compound (photoinitiator) capable of initiating polymerization of a polymerizable component via irradiation with visible light, ultraviolet light, far ultraviolet light, an electron beam, X-rays, etc. The photoinitiator group is preferably a group having a structure derived from a radical polymerization initiator capable of generating radicals via light irradiation. Specific examples thereof include a group having a structure derived from an acetophenone compound, an oxime ester compound, a dibenzoyl compound, a benzoin compound, a benzophenone compound, an alkylphenone compound, or an acylphosphine oxide compound. Among these, the photoinitiator group is preferably a group having an acetophenone structure. When the polymer (P) has at least either a radical polymerizable group or a photoinitiator group, it is preferable that these groups be present in the side chain.

Examples of the nitrogen-containing heterocyclic ring of the polymer (P) include pyrrole, imidazole, pyrazole, triazole, pyridine, pyrimidine, pyridazine, pyrazine, indole, benzimidazole, purine, quinoline, isoquinoline, naphthyridine, quinoxaline, phthalazine, triazine, carbazole, acridine, piperidine, piperazine, pyrrolidine, hexamethyleneimine, etc. Among these, it is preferable to have at least one selected from the group consisting of pyridine, pyrimidine, pyrazine, piperidine, piperazine, quinoline, carbazole and acridine.

The amino group and the protected amino group of the polymer (P) are preferably groups represented by the following Formula (N-1).

(N-1)

(In Formula (N-1), $R^{50}$ is a hydrogen atom or a monovalent organic group. "*" represents a bonding position bonded to a hydrocarbon group.)

In Formula (N-1), the monovalent organic group for $R^{50}$ is preferably a monovalent hydrocarbon group or a protecting group. The monovalent hydrocarbon group preferably has 1 to 10 carbon atoms and specific examples thereof include a linear or branched alkyl group such as a methyl group, an ethyl group, a propyl group and a butyl group; a cycloalkyl group such as a cyclohexyl group; an aryl group such as a phenyl group and methylphenyl group; an aralkyl group such as a benzyl group, etc. Examples of the substituent which $R^{50}$ may have include a halogen atom, a cyano group, an alkylsilyl group, an alkoxysilyl group, etc. $R^{50}$ is preferably an alkyl group having 1 to 5 carbon atoms, a cyclohexyl group, a phenyl group or a benzyl group. Examples of the hydrocarbon group to which "*" in Formula (N-1) is bonded include an alkanediyl group, a cyclohexylene group, a phenylene group, etc.

The protecting group is a thermally-cleavable group, and examples thereof include a carbamate-based protecting group, an amide-based protecting group, an imide-based protecting group, a sulfonamide-based protecting group, groups represented by each of the following Formulas (8-1) to (8-5) and the like. Among these, the tert-butoxycarbonyl group is preferred from the viewpoint of high thermal cleavablity and reduction in the amount of residual deprotected portions in the film.

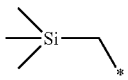
(8-1)

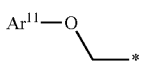
(8-2)

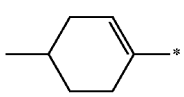
(8-3)

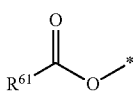
(8-4)

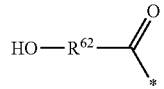
(8-5)

(In Formulas (8-1) to (8-5), $Ar^{11}$ is a monovalent group having 6 to 10 carbon atoms obtained by removing one hydrogen atom from a substituted or unsubstituted aromatic ring, $R^{61}$ is an alkyl group having 1 to 12 carbon atoms, and $R^{62}$ is a methylene group or an ethylene group. "*" represents a bonding position bonded to a nitrogen atom.)

The polymer (P) preferably has a partial structure represented by the following Formula (3) in addition to the specific partial structure in terms of improving the afterimage characteristics of the liquid crystal element 10 and the response speed of the liquid crystal molecules 12a.

$$*\text{-}L^1\text{-}R^1\text{---}R^2\text{---}R^3\text{---}R^4 \quad (3)$$

(In Formula (3), $L^1$ represents —O—, —CO—, —COO—*¹, —OCO—*¹, —NR⁵—, —NR⁵—CO—*¹, —CO—NR⁵—*¹, an alkanediyl group having 1 to 6 carbon atoms, —O—R⁶—*¹, or —R⁶—O—*¹ (wherein R⁵ is a hydrogen atom or a monovalent hydrocarbon group having 1 to 10 carbon atoms, and R⁶ is an alkanediyl group having 1 to 3 carbon atoms. "*¹" represents a bonding position with $R^1$). $R^1$ and $R^3$ each independently represent a single bond, a phenylene group or a cycloalkylene group, $R^2$ represents a single bond, a phenylene group, a cycloalkylene group, —R⁷—B¹—*², or —B¹—R⁷—*² (wherein R⁷ is a phenylene group or a cycloalkylene group, and B¹ is a single bond, —COO—*³, —OCO—*³, or an alkanediyl group having 1 to 3 carbon atoms, "*²", represents a bonding position with $R^3$, and "*³" represents a bonding position with $R^7$). $R^4$ represents a hydrogen atom, a fluorine atom, an alkyl group having 1 to 18 carbon atoms, a fluoroalkyl group having 1 to 18 carbon atoms, an alkoxy group having 1 to 18 carbon atoms, a fluoroalkoxy group having 1 to 18 carbon atoms, or a hydrocarbon group having a steroid skeleton and having 17 to 51 carbon atoms, and may have a radical polymerizable group or a photoinitiator group. However, when $R^4$ is a hydrogen atom or a fluorine atom, not all of $R^1$, $R^2$ and $R^3$ are single bonds. "*" represents a bonding position.)

In Formula (3), the alkanediyl group for $L^1$ and $B^1$, and the alkyl group, fluoroalkyl group, alkoxy group and fluoroalkoxy group for $R^4$ are preferably linear. Examples of the group having a steroid skeleton for $R^4$ include a cholestanyl group, a cholesteryl group, a lanostanyl group, etc.

The abundance of the partial structure represented by Formula (3) in the polymer (P) is suitably set according to the main chain of the polymer (P) or the like, but it is preferably 1 to 50 mol %, and more preferably 2 to 40 mol % based on all the structural units of the polymer (P) from the viewpoint of sufficiently increasing the response speed of the liquid crystal.

The main skeleton of the polymer (P) is not particularly limited, and examples thereof include skeletons of polyamic acid, polyamic acid ester, polyimide, polyorganosiloxane, polyester, polyamide, polybenzoxazole precursors, polybenzoxazole, cellulose derivatives, polyacetal, polystyrene derivatives, poly(styrene-phenylmaleimide) derivatives, poly (meth)acrylates, etc. Further, (meth)acrylate means including acrylate and methacrylate. The polymer (P) may be used as one type alone or two or more types thereof may be used in combination in the preparation of the liquid crystal alignment agent. Among these, the polymer (P) is preferably a polymer of at least one selected from the group consisting of polyamic acids, polyamic acid esters, polyimides and polyorganosiloxanes.

(Polyamic Acid, Polyamic Acid Ester and Polyimide)

When the polymer (P) is at least one selected from the group consisting of polyamic acids, polyamic acid esters and polyimides, for example, the polymer (P) may be obtained by reacting at least one tetracarboxylic acid derivative selected from the group consisting of tetracarboxylic acid dianhydrides, tetracarboxylic acid diesters and tetracarboxylic acid diester dihalides with a diamine.

Specifically, for example, a polyamic acid may be obtained by reacting a tetracarboxylic acid dianhydride with a diamine. For example, a polyamic acid ester may be prepared by using a method of reacting a polyamic acid, obtained by reacting a tetracarboxylic acid dianhydride with a diamine, with an esterifying agent (e.g., methanol, ethanol, N,N-dimethylformamide diethyl acetal and the like), a method of reacting a tetracarboxylic acid diester with a diamine, a method of reacting a tetracarboxylic acid diester dihalide with a diamine, etc. For example, a polyimide may be obtained by imidizing a polyamic acid by further dehydrating and cyclizing.

Here, examples of the tetracarboxylic acid derivative used for polymerization include aliphatic tetracarboxylic dianhydrides, alicyclic tetracarboxylic dianhydrides, aromatic tetracarboxylic dianhydrides, derivatives thereof, etc. Specifically, examples of an aliphatic tetracarboxylic dianhydride include butanetetracarboxylic dianhydride, ethylenediaminetetraacetic dianhydride and the like;

examples of an alicyclic tetracarboxylic dianhydride include 1,2,3,4-cyclobutanetetracarboxylic dianhydride, 2,3,5-tricarboxycyclopentylacetic dianhydride, 5-(2,5-dioxotetrahydrofuran-3-yl)-3a,4,5,9b-tetrahydronaphtho[1,2-c]furan-1,3-dione, 5-(2,5-dioxotetrahydrofuran-3-yl)-8-methyl-3a,4,5,9b-tetrahydronaphtho[1,2-c]furan-1,3-dione, bicyclo[3.3.0]octane-2,4,6,8-tetracarboxylic acid 2:4,6:8-dianhydride, bicyclo[2.2.1]heptane-2,3,5,6-tetracarboxylic acid 2:3,5:6-dianhydride, 1,2,4,5-cyclohexanetetracarboxylic dianhydride, bicyclo[2.2.2]oct-7-ene-2,3,5,6-tetracarboxylic dianhydride, cyclopentanetetracarboxylic acid dianhydride, etc.

Examples of an aromatic tetracarboxylic dianhydride include pyromellitic dianhydride, 4,4'-(hexafluoroisopropylidene) diphthalic anhydride, ethylene glycol bis(anhydrotrimellitate), 1,3-propylene glycol bis(anhydrotrimellitate), 3,3',4,4'-biphenyl ether tetracarboxylic dianhydride, 3,3',4,4'-benzophenonetetracarboxylic dianhydride, etc. Further, a tetracarboxylic acid derivative may be used as one type alone or two or more types thereof may be used in combination.

The tetracarboxylic acid derivative used for the polymerization preferably contains an alicyclic tetracarboxylic acid derivative, and more preferably has tetracarboxylic acid derivative containing at least one ring structure selected from the group consisting of a cyclobutane ring, a cyclopentane ring and a cyclohexane ring (hereinafter, also referred to as a "specific acid derivative"). Preferred specific examples of the specific acid derivative include 1,2,3,4-cyclobutanetetracarboxylic dianhydride, 2,3,5-tricarboxycyclopentylacetic dianhydride, 5-(2,5-dioxotetrahydrofuran-3-yl)-3a,4,5,9b-tetrahydronaphtho[1,2-c]furan-1,3-dione, 5-(2,5-dioxotetrahydrofuran-3-yl)-8-methyl-3a,4,5,9b-tetrahydronaphtho[1,2-c]furan-1,3-dione, cyclopentanetetracarboxylic dianhydride, bicyclo[3.3.0]octane-2,4,6,8-tetracarboxylic dianhydride, cyclohexane tetracarboxylic dianhydride, and derivatives thereof, etc.

The proportion of the alicyclic tetracarboxylic acid derivative used (the total amount when two or more types are used) is preferably 10 mol % or more, more preferably 20 mol % or more, and further more preferably 30 mol % or more based on the total amount of the tetracarboxylic acid derivative used for polymerization.

Examples of the diamine used for the polymerization include aliphatic diamines, alicyclic diamines, aromatic diamines, diaminoorganosiloxanes, etc. As specific examples thereof, examples of aliphatic diamines include metaxylylenediamine, 1,3-propanediamine, tetramethylenediamine, pentamethylenediamine, hexamethylenediamine, 1,3-bis(aminomethyl)cyclohexane and the like; and examples of the alicyclic diamine include 1,4-diaminocyclohexane, 4,4'-methylenebis(cyclohexylamine) and the like.

Examples of the aromatic diamine include a side chain-type diamine such as dodecanoxydiaminobenzene, tetradecanoxydiaminobenzene, octadecanoxydiaminobenzene, cholestanyloxydiaminobenzene, cholesteryloxydiaminobenzene, cholestanyl diaminobenzoate, cholesteryl diaminobenzoate, lanostanyl diaminobenzoate, 3,6-bis(4-aminobenzoyloxy)cholestane, 3,6-bis(4-aminophenoxy)cholestane, 1,1-bis(4-((aminophenyl)methyl)phenyl)-4-butylcyclohexane, 1,1-bis(4-((aminophenoxy)methyl)phenyl)-4-heptylcyclohexane, N-(2,4-diaminophenyl)-4-(4-heptylcyclohexyl)benzamide, compounds represented by the following Formula (E-1), a diamine having a radical polymerizable group, a diamine having a photoinitiator group and the like;

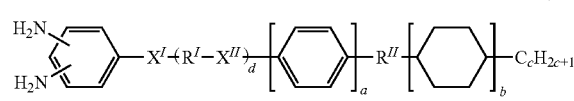

(E-1)

(in Formula (E-1), $X^I$ and $X^{II}$ each independently represent a single bond, —O—, *—COO— or *—OCO— (wherein "*" represents a bonding position with $X^I$), $R^I$ is an alkanediyl group having 1 to 3 carbon atoms, $R^{II}$ is a single bond or an alkanediyl group having 1 to 3 carbon atoms, a is 0 or 1, b is an integer of 0 to 2, c is an integer of 1 to 20, and d is 0 or 1, provided that a and b are not 0 at the same time)

and a non-side chain type-diamine such as p-phenylenediamine, 4,4'-diaminodiphenylmethane, 4,4'-diaminodiphenyl sulfide, 4-aminophenyl-4'-aminobenzoate, 4,4'-diaminoazobenzene, 1,5-bis(4-aminophenoxy)pentane, 1,7-bis(4-aminophenoxy)heptane, bis[2-(4-aminophenyl)ethyl] hexanedioic acid, diaminobenzoic acid, 2,2'-dimethyl-4,4'-diaminobiphenyl, 2,2'-bis(trifluoromethyl)-4,4'-diaminobiphenyl, 4,4'-diaminodiphenyl ether, 2,2-bis[4-(4-aminophenoxy)phenyl]propane, 9,9-bis(4-aminophenyl) fluorene, 2,2-bis[4-(4-aminophenoxy)phenyl] hexafluoropropane, 2,2-bis(4-aminophenyl) hexafluoropropane, 4,4'-(m-phenylenediisopropylidene) bisaniline, 1,4-bis(4-aminophenoxy)benzene, 4,4'-bis(4-aminophenoxy)biphenyl and the like.

Examples of the diaminoorganosiloxane include 1,3-bis (3-aminopropyl)-tetramethyldisiloxane and the like, and the diamine described in Japanese Unexamined Patent Application Publication No. 2010-97188 may also be used. Further, a diamine may be used as one type alone or two or more types thereof may be used in combination.

Specific examples of the compound represented by Formula (E-1) include compounds represented by each of the following Formulas (E-1-1) to (E-1-3) and the like.

(E-1-1)
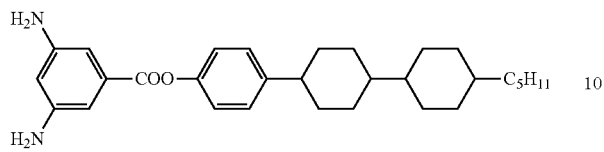

(E-1-2)
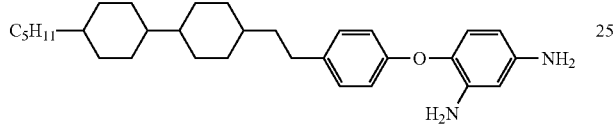

(E-1-3)
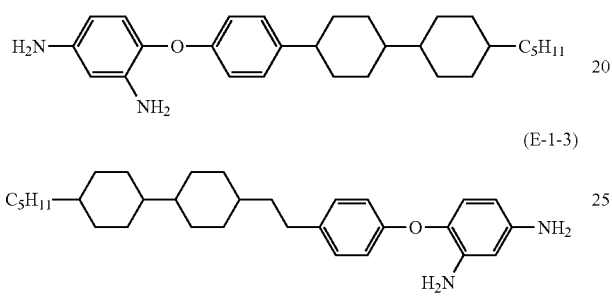

Specific examples of the diamine having a radical polymerizable group include compounds represented by each of the following Formulas (J-1) to (J-3) and the like, and specific examples of the diamine having a photoinitiator group include compounds represented by each of the following Formulas (K-1) to (K-4) and the like, respectively.

(J-1)
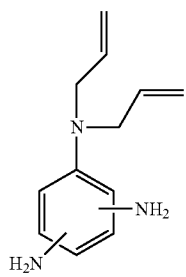

(J-2)
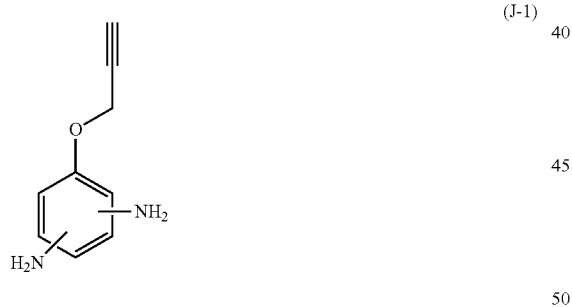

(J-3)
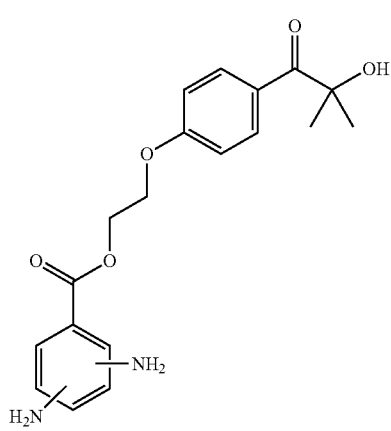

(K-1)
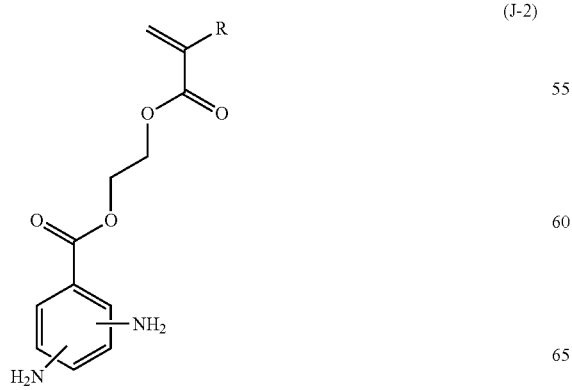

(K-2)
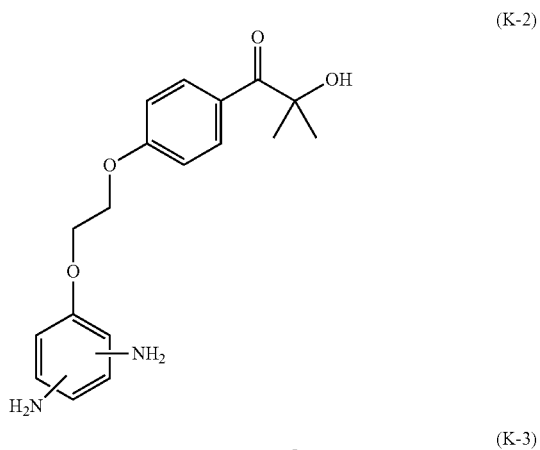

(K-3)
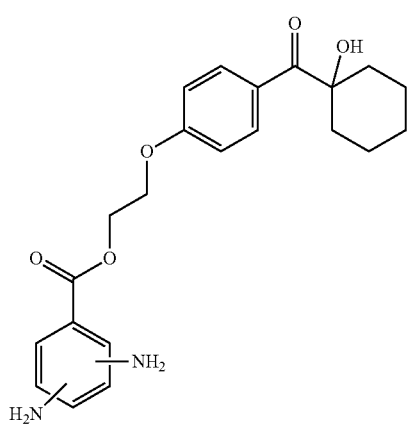

(K-4)

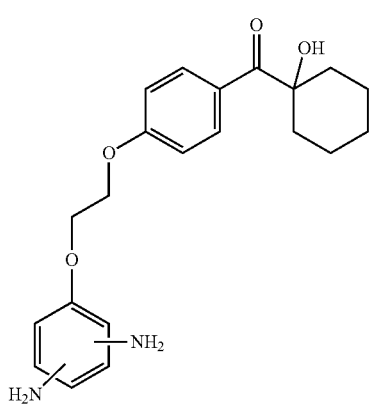

(In Formula (J-2), R is a hydrogen atom or a methyl group.)

In the polymerization, a diamine having at least one structure selected from the group consisting of a nitrogen-containing heterocyclic ring and a group represented by Formula (N-1) (hereinafter, also referred to as a "nitrogen-containing structure") may be used as the diamine. A polymer having a nitrogen-containing structure can be relatively easily obtained and the effect of reducing afterimages of the liquid crystal element can be sufficiently attained by using a diamine having a nitrogen-containing structure and thus is preferred.

The diamine having a nitrogen-containing structure is not particularly limited as long as it has a nitrogen-containing structure and two primary amino groups, but specific examples thereof include 4,4'-diaminodiphenylamine, 2,6-diaminopyridine, 3,4-diaminopyridine, 2,4-diaminopyrimidine, 3,6-diaminocarbazole, N-methyl-3,6-diaminocarbazole, 1,4-bis-(4-aminophenyl)-piperazine, 3,6-diaminoacridine, N-ethyl-3,6-diaminocarbazole, N-phenyl-3,6-diaminocarbazole, N,N'-bis(4-aminophenyl)-benzidine, N,N'-bis(4-aminophenyl)-N,N'-dimethylbenzidine, N,N-bis(4-aminophenyl) methylamine, compounds represented by each of the following Formulas (N-1-1) to (N-1-10) and the like.

(N-1-1)
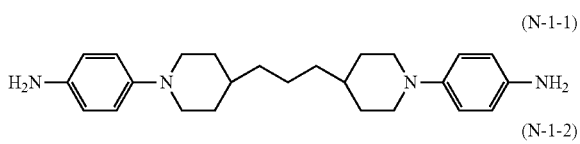

(N-1-2)
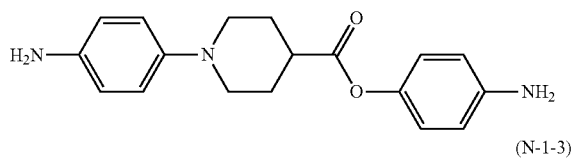

(N-1-3)
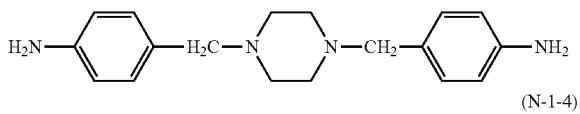

(N-1-4)
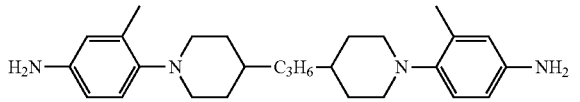

(N-1-5)
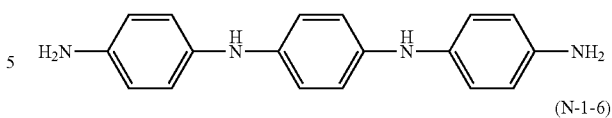

(N-1-6)
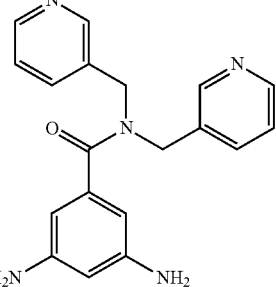

(N-1-7)
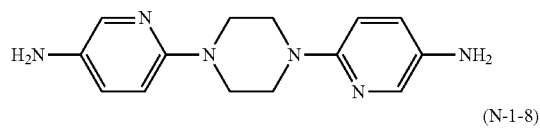

(N-1-8)
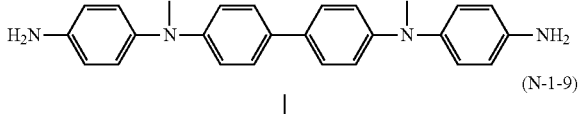

(N-1-9)
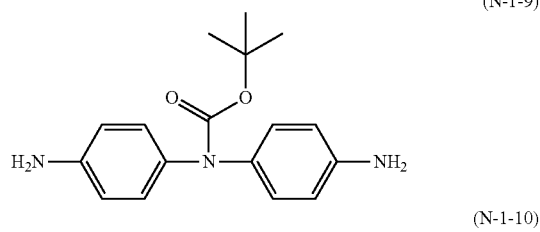

(N-1-10)
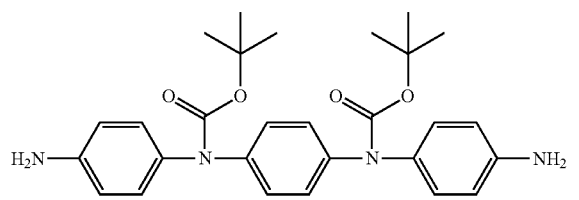

In the above polymerization, the proportion of the diamine having a nitrogen-containing structure used is preferably 0.1 mol % or more, more preferably 1 mol % or more, and still more preferably 2 mol % or more with respect to the total amount of the diamine used for synthesis from the viewpoint of sufficiently reducing afterimages of the liquid crystal element and the effect of improving the response speed of the liquid crystal. Furthermore, the upper limit of the proportion used is preferably 60 mol % or less, more preferably 50 mol % or less, and still more preferably 40 mol % or less. A diamine having a nitrogen-containing structure may be used as one type alone or two or more types thereof may be used in combination.

Further, a method of obtaining the polymer (P) having a nitrogen-containing structure is not limited to a method using a diamine having a nitrogen-containing structure as at least a part of a raw material, and for example, the polymer (P) having a nitrogen-containing structure may also be obtained by a method of reacting a tetracarboxylic acid derivative having a nitrogen-containing structure with a diamine.

A polyamic acid may be obtained by reacting a tetracarboxylic acid dianhydride and a diamine as described above with a molecular weight regulator if necessary. The proportions of the tetracarboxylic acid dianhydride and the diamine used for the synthesis reaction of a polyamic acid are preferably such that there are 0.2 to 2 equivalents of the acid anhydride group of the tetracarboxylic acid dianhydride with respect to one equivalent of the amino group of the diamine. Examples of the molecular weight regulator include acid monoanhydride such as maleic anhydride, phthalic anhydride and itaconic anhydride, monoamine compounds such as aniline, cyclohexylamine and n-butylamine, monoisocyanate compounds such as phenyl isocyanate and naphthyl isocyanate, etc. The proportion of the molecular weight regulator used is preferably 20 parts by mass or less with respect to 100 parts by mass of the total amount of the tetracarboxylic acid dianhydride and diamine used.

The synthesis reaction of a polyamic acid is preferably performed in an organic solvent. The reaction temperature at this time is preferably −20 to 150° C., and the reaction time is preferably 0.1 to 24 hours. As the organic solvent used for the reaction, one or more selected from the group consisting of an aprotic polar solvent and a phenolic solvent (organic solvents of a first group) or a mixture of one or more selected from the organic solvents of the first group and one or more selected from the group consisting of alcohols, ketones, esters, ethers, halogenated hydrocarbons and hydrocarbons (organic solvents of a second group) are preferably used. In the latter case, the proportion of the organic solvent of the second group is preferably 50 mass % or less with respect to the total amount of the organic solvent of the first group and the organic solvent of the second group. The amount (a) of the organic solvent used is preferably such that the total amount (b) of the tetracarboxylic acid dianhydride and the diamine is 0.1 to 50 mass % with respect to the total amount (a+b) of a reaction solution.

When a polyimide is used as the polymer (P), an imidization rate of the polyimide is preferably 10% or more, more preferably 20 to 99%, and still more preferably 20 to 85%. The imidization rate is expressed as a percentage as the ratio of the number of imide ring structures to the sum of the number of amic acid structures and the number of imide ring structures of the polyimide.

The dehydration-cyclization of a polyamic acid is preferably carried out by a method of dissolving the polyamic acid in an organic solvent, adding a dehydrating agent and a dehydration-cyclization catalyst to the solution, and heating if necessary. As the dehydrating agent, for example, an acid anhydride such as acetic anhydride, propionic anhydride, trifluoroacetic anhydride or the like may be used. The amount of the dehydrating agent used is preferably 0.01 to 20 mol based on 1 mol of the amic acid structure of the polyamic acid. As the dehydration-cyclization catalyst, for example, tertiary amines such as pyridine, collidine, lutidine, triethylamine and the like may be used. The amount of the dehydration-cyclization catalyst used is preferably 0.01 to 10 mol based on 1 mol of the dehydrating agent to be used. Examples of the organic solvent used for the dehydration-cyclization reaction include organic solvents exemplified as those used for the synthesis of a polyamic acid. The reaction temperature of the dehydration-cyclization reaction is preferably 0 to 180° C., and more preferably 10 to 150° C. The reaction time is preferably 1.0 to 120 hours, and more preferably 2.0 to 30 hours.

When the polymer (P) is at least one selected from the group consisting of polyamic acids, polyamic acid esters and polyimides, the polymer has at least one partial structure selected from the group consisting of a partial structure represented by the following Formula (p-1) and a partial structure represented by the following Formula (p-2).

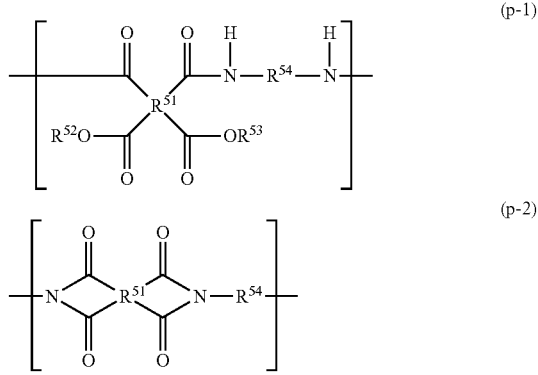

(In Formulas (p-1) and (p-2), $R^{51}$ is a tetravalent organic group, $R^{52}$ and $R^{53}$ each independently represent a hydrogen atom or a monovalent organic group, and $R^{54}$ is a divalent organic group. However, at least one of $R^{51}$ to $R^{54}$ has at least one group selected from the group consisting of a radical polymerizable group, a photoinitiator group, a nitrogen-containing heterocycle, an amino group and a protected amino group.)

An example of the monovalent organic group for $R^{52}$ and $R^{53}$ in the above Formula (p-1) includes a monovalent hydrocarbon group having 1 to 10 carbon atoms or the like. The tetravalent organic group for $R^{51}$ is the remaining group obtained by removing two acid anhydride groups from a tetracarboxylic acid dianhydride and the divalent organic group for $R^{54}$ is the remaining group obtained by removing two primary amino groups from a diamine, and preferably has a specific partial structure.

The polyamic acid, polyamic acid ester and polyimide obtained as described above preferably have a solution viscosity of 10 to 800 mPa·s, and more preferably 15 to 500 mPa·s when they are in solutions having a concentration of 10 mass %. Further, the solution viscosity (mPa·s) of the polymer is a value for a polymer solution having a concentration of 10 mass % prepared using a good solvent (e.g., γ-butyrolactone, N-methyl-2-pyrrolidone, etc.) measured at 25° C. using an E type rotational viscometer.

For the polyamic acid, polyamic acid ester and polyimide, the polystyrene equivalent weight average molecular weight (Mw) measured by gel permeation chromatography (GPC) is preferably 1,000 to 500,000, and more preferably 2,000 to 300,000. Furthermore, the molecular weight distribution (Mw/Mn) represented by the ratio of a weight-average molecular weight (Mw) to a number average molecular (Mn) weight in terms of polystyrene measured by GPC is preferably 10 or less, and more preferably 7 or less. With such a molecular weight range, excellent alignment properties and stability of the liquid crystal element can be secured.

(Polyorganosiloxane)

When the polymer (P) is a polyorganosiloxane, for example, a polyorganosiloxane as the polymer (P) may be obtained by [1] a method of synthesizing a polyorganosiloxane having an epoxy group in its side chain by polymerization using an epoxy group-containing silane compound as at least a part of the raw materials and subsequently reacting with a polyorganosiloxane having an epoxy group in its side chain and a carboxylic acid having a specific partial structure, [2] a method by polymerization using a hydrolyzable silane compound having a specific partial structure as a monomer, etc.

For example, a polyorganosiloxane may be obtained by hydrolyzing and condensing a hydrolyzable silane compound. Examples of the silane compound include tetramethoxysilane, tetraethoxysilane, methyltrimethoxysilane, methyltriethoxysilane, dimethyldimethoxysilane, 3-mercaptopropyltrimethoxysilane, 3-mercaptopropyltriethoxysilane, mercaptomethyl trimethoxysilane, 3-aminopropyltrimethoxysilane, 3-aminopropyltriethoxysilane, 3-ureidopropyltrimethoxysilane, 3-glycidoxypropyltriethoxysilane, 3-glycidoxypropylmethyldimethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropylmethyldimethoxysilane, 3-(meth)acryloxypropylmethyldiethoxysilane, 8-(meth)acryloxyoctyltrimethoxysilane, vinyltrimethoxysilane, p-styryltrimethoxysilane, trimethoxysilylpropylsuccinic anhydride, etc. A hydrolyzable silane compound may be used as one type alone or two or more types thereof may be used in combination. "(Meth)acryloxy" means including "acryloxy" and "methacryloxy".

The hydrolysis and condensation reaction is carried out by reacting one or two or more silane compounds with water, preferably in the presence of a suitable catalyst and an organic solvent. In the reaction, the proportion of water used is preferably 1 to 30 moles based on 1 mole of the silane compounds (total amount). Examples of the catalyst used include an acid, an alkali metal compound, an organic base, a titanium compound, a zirconium compound, etc. The amount of the catalyst used varies depending on the reaction conditions such as the type of catalyst, the temperature and the like, but for example, may be 0.01 to 3 times the molar amount of the total amount of silane compounds. Examples of the organic solvent used include hydrocarbons, ketones, esters, ethers, alcohols and the like, and a water-insoluble or hardly water-soluble organic solvent is preferably used. The proportion of the organic solvent used is preferably 10 to 10,000 parts by mass with respect to 100 parts by mass of the total amount of the silane compounds used in the reaction. The reaction is preferably performed by heating with an oil bath or the like. The heating temperature at this time is preferably 130° C. or less, and the heating time is preferably 0.5 to 12 hours. After completion of the reaction, the desired organic polyorganosiloxane may be obtained by drying the organic solvent layer fractionated from the reaction solution with a drying agent if necessary and then removing the solvent. Further, the synthesis method of a polyorganosiloxane is not limited to the above hydrolysis and condensation reaction, and for example, may be carried out by a method of reacting a hydrolyzable silane compound in the presence of oxalic acid and an alcohol.

In the above method [1], the epoxy group-containing polyorganosiloxane obtained by the hydrolysis and condensation reaction is subsequently reacted with a carboxylic acid having a specific partial structure. The proportion of the carboxylic acid having a specific partial structure used is preferably 0.001 to 1.2 mol, and more preferably 0.01 to 0.8 mol based on 1 mol of the total amount of epoxy groups of the polyorganosiloxane.

The reaction between the epoxy group-containing polysiloxane and the carboxylic acid is preferably carried out in the presence of a catalyst and an organic solvent. As the catalyst, for example, a compound known as a so-called curing promoter that promotes the reaction of an organic base and an epoxy compound may be used. The proportion of the catalyst used is preferably 100 parts by mass or less, and more preferably 0.01 to 100 parts by mass based on 100 parts by mass of the epoxy group-containing polysiloxane.

Examples of the organic solvent used in the reaction include hydrocarbons, ethers, esters, ketones, amides, alcohols, etc. Specific examples of particularly preferred solvents include 2-butanone, 2-hexanone, methyl isobutyl ketone, butyl acetate, etc. The organic solvent is preferably used in such a proportion that the solid content concentration is 0.1 mass % or more, and more preferably 5 to 50 mass %. The reaction temperature is preferably 0 to 200° C., and the reaction time is preferably 0.1 to 50 hours. Furthermore, after completion of the reaction, the organic solvent layer fractionated from the reaction solution is preferably washed with water. After washing with water, a polyorganosiloxane having a specific partial structure in the side chain may be obtained by drying the organic solvent layer with a suitable drying agent if necessary and then removing the solvent.

For the polyorganosiloxane, the weight average molecular weight (Mw) in terms of polystyrene measured by GPC is preferably in the range of 100 to 50,000, and more preferably in the range of 200 to 10,000. When the weight average molecular weight of the polyorganosiloxane is in the above range, handling is easy when preparing a liquid crystal alignment film, and the obtained liquid crystal alignment film has sufficient material strength and specific characteristics.

The polymer (P) contained in the liquid crystal alignment agent may be of only one type or two or more types. Examples of the preferred embodiment of inclusion of the polymer (P) in the liquid crystal alignment agent include the following embodiments of (i) to (iii), etc.

(i) An embodiment in which a polymer having at least one selected from the group consisting of a radical polymerizable group and a photoinitiator group (hereinafter, referred to as a "partial structure A") is contained as the polymer (P).

(ii) An embodiment in which a polymer having at least one selected from the group consisting of a nitrogen-containing heterocycle (excluding imide rings in polyimides), a secondary amino group and a tertiary amino group (hereinafter, referred to as a "partial structure B") is contained as the polymer (P).

(iii) An embodiment in which a polymer having the partial structure A and the partial structure B in the same molecule or different molecules is contained as the polymer (P).

Among them, embodiments (i) and (iii) are preferred in terms of an effect of greatly reducing AC afterimages due to an AC voltage and improving the response speed of the liquid crystal molecules, and embodiments (ii) and (iii) are preferred in terms of an effect of greatly reducing DC afterimages due to a DC voltage. Among these, the embodiment (iii) is particularly preferred in terms of an effect of greatly reducing afterimages of the liquid crystal element and high storage stability of the liquid crystal alignment agent. Examples of the embodiment (iii) include the following embodiments (iii-1) to (iii-4) and the like.

(iii-1) An embodiment in which a polymer having a partial structure A and a polymer having a partial structure B are contained as the polymer (P).

(iii-2) An embodiment in which a polymer having a partial structure A and a partial structure B in the same molecule is contained as the polymer (P).

(iii-3) An embodiment in which a polymer having a partial structure A and a polymer having a partial structure A and a partial structure B are contained as the polymer (P).

(iii-4) An embodiment in which a polymer having a partial structure B and a polymer having a partial structure A and a partial structure B are contained as the polymer (P).

The abundance of the partial structure A in one molecule of the polymer (P) is preferably 1 to 50 mol %, and more preferably 2 to 40 mol % based on all structural units of the polymer (P) from the viewpoint of sufficiently obtaining the effect of improving afterimage reduction of the liquid crystal element (in particular, reduction of AC afterimages due to an AC voltage). Furthermore, the content of the partial structure B in one molecule of the polymer (P) is preferably 1 to 50 mol %, and more preferably 2 to 40 mol % based on all structural units of the polymer (P) from the viewpoint of sufficiently obtaining the effect of improving afterimage reduction of the liquid crystal element (in particular, reduction of DC afterimages due to a DC voltage). Accordingly, in the synthesis of the polymer (P), it is preferable to select monomers such that the abundances of the partial structure A and partial structure B are within the above ranges.

Further, it is considered that, while the alkenyl compound can increase the response speed of the liquid crystal, reliability is relatively low and the performance of the alkenyl compound is deteriorated by the light irradiated during manufacturing a PSA panel. In this regard, it is assumed that the deterioration in performance due to light on the alkenyl compound was minimized by using the terphenyl compound together with the alkenyl compound. In addition, it is assumed that functions such as minimization of deterioration in performance due to light on the alkenyl compound, improvement of reactivity of the radical polymerizable component, capture of impurities and the like work together in a complex manner by incorporating a specific partial structure into the liquid crystal alignment film, and as a result, a liquid crystal element having excellent afterimage characteristics and response speed can be obtained. Further, this is merely an assumption, and is not intended to limit the present disclosure.

(Other Components)

The liquid crystal alignment agent of the present disclosure may contain components other than the polymer (P) as long as they do not interfere with the purpose and effects of the present disclosure. Examples of the other components include polymers other than the polymer (P), a compound having at least one photopolymerizable group in the molecule (hereinafter also referred to as a "photopolymerizable compound"), a compound having at least one epoxy group in the molecule other than the compound represented by the above Formula (1), a functional silane compound, a surfactant, a filler, a defoaming agent, a sensitizer, a dispersant, an antioxidant, an adhesion aid, an antistatic agent, a leveling agent, an antibacterial agent, etc. The proportions thereof may be suitably set in accordance with various compounds within a range not interfering with the effects of the present disclosure.

(Solvent)

The liquid crystal alignment agent of the present disclosure is prepared as a liquid composition in which the polymer (P) and other components used if necessary are preferably dispersed or dissolved in a suitable organic solvent.

Examples of the organic solvent used include N-methyl-2-pyrrolidone, N-ethyl-2-pyrrolidone, 1,3-dimethyl-1-imidazolidinone, γ-butyrolactone, γ-butyrolactam, N,N-dimethylformamide, N,N-dimethylacetamide, 3-methoxy-N,N-dimethylpropanamide, 3-butoxy-N,N-dimethylpropanamide, N,N,2-trimethylpropanamide, 1-butoxy-2-propanol, diacetone alcohol, propylene glycol diacetate, dipropylene glycol monomethyl ether, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol-n-propyl ether, ethylene glycol-i-propyl ether, ethylene glycol n-butyl ether (butyl cellosolve), ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, diisobutyl ketone, isoamyl propionate, isoamyl isobutyrate, diisopentyl ether, ethylene carbonate, propylene carbonate, diethylene glycol monohexyl ether, triethylene glycol dimethyl ether etc. These may be used as one type alone or two or more types thereof may be used in combination.

The solid concentration of the liquid crystal alignment agent (the ratio of the total weight of the components other than the solvent of the liquid crystal alignment agent to the total weight of the liquid crystal alignment agent) is suitably selected in consideration of viscosity, volatility and the like, and is preferably in the range of 1 to 10 mass %. When the solid content concentration is less than 1 mass %, the film thickness of the coating film is too small, and thus it is difficult to obtain an excellent liquid crystal alignment film. On the other hand, when the solid content concentration exceeds 10 mass %, the film thickness of the coating film is too large, and thus it is difficult to obtain an excellent liquid crystal alignment film, and the viscosity of the liquid crystal alignment agent tends to increase, resulting in a decrease in coatability. The temperature in preparation of the liquid crystal alignment agent is preferably 10 to 50° C., and more preferably 20 to 30° C.

The liquid crystal element 10 of the present disclosure may be effectively applied to various devices and, for example, may be used for various display devices such as a clock, portable game, word processor, laptop computer, car navigation system, camcorder, PDA, digital camera, mobile phone, smartphone, various monitors, a liquid crystal television, an information display, etc. Furthermore, the liquid crystal element of the present disclosure may also be used as a light control film or retardation film.

EXAMPLES

Hereinafter, the present disclosure will be described in further detail with reference to examples, but the present disclosure is not limited to these examples.

In the following examples and comparative examples, the imidization rate of a polyimide in the polymer solution, the solution viscosity of the polymer solution, the weight average molecular weight of the polymer, and the epoxy equivalent were measured by the following methods. Hereinafter, the compound represented by Formula X may be simply referred to as "compound X".

(Imidization Rate of Polyimide)

A solution of a polyimide was poured into pure water and the obtained precipitate was sufficiently dried under reduced pressure at room temperature, and then dissolved in deuterated dimethylsulfoxide, and $^1$H-NMR analysis was performed at room temperature using tetramethylsilane as a reference substance. The imidization rate [%] was determined by the following Equation (1) from the obtained $^1$H-NMR spectrum.

$$\text{Imidization rate [\%]}=(1-A^1/A^2 \times \alpha) \times 100 \qquad (1)$$

(In Equation (1), $A^1$ is a peak area derived from the proton of an NH group appearing in the vicinity of a chemical shift of 10 ppm, $A^2$ is a peak area derived from other protons, and a is a ratio of the number of other protons to one proton of an NH group in a precursor (polyamic acid) of the polymer.)

(Weight Average Molecular Weight of Polymer)

The weight average molecular weight is a polystyrene equivalent value measured by gel permeation chromatography under the following conditions.

Column: TSKgel GRCXLII manufactured by Tosoh Corporation

Solvent: Tetrahydrofuran
Temperature: 40° C.
Pressure: 68 kgf/cm²

(Epoxy Equivalent)

The epoxy equivalent was measured by a hydrochloric acid-methyl ethyl ketone method described in JIS C 2105.

Structural formulas of the compounds used in the present examples were as follows. Further, in the following, the "compound represented by Formula (X)" may simply be abbreviated as "compound (X)" for the sake of convenience.

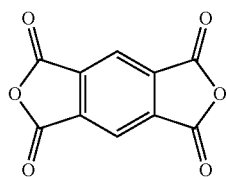 (t-1)

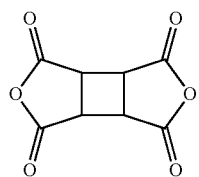 (t-2)

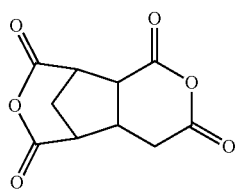 (t-3)

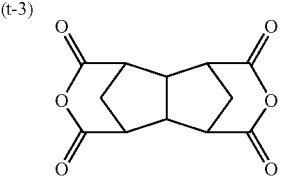 (t-4)

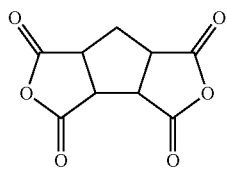 (t-5)

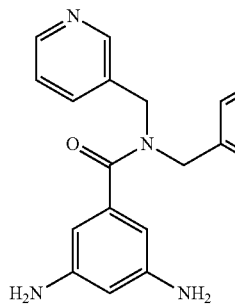 (d-1)

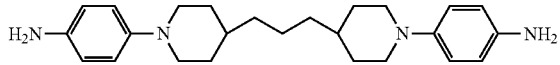 (d-2)

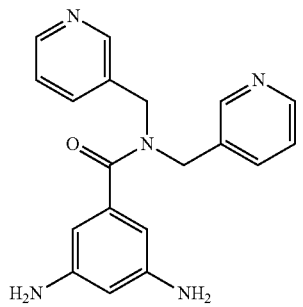 (d-3)

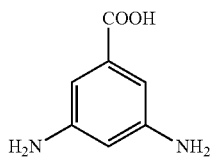 (d-4)

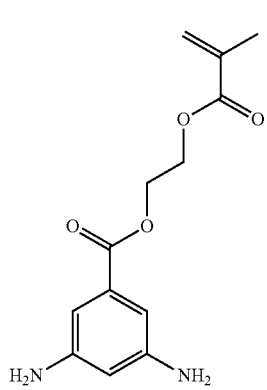 (d-5)

-continued
(d-6)
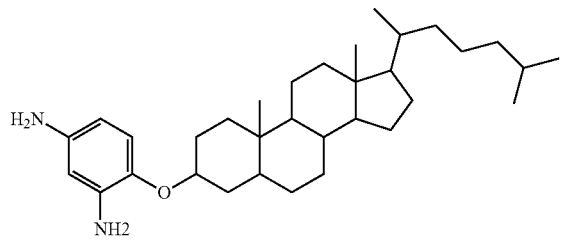
(d-7)
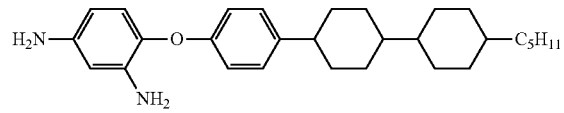
(d-8)
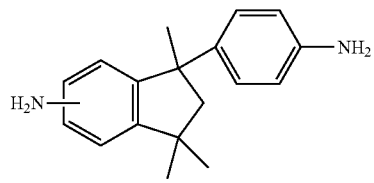
(d-9)
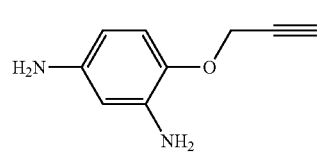
(d-10)
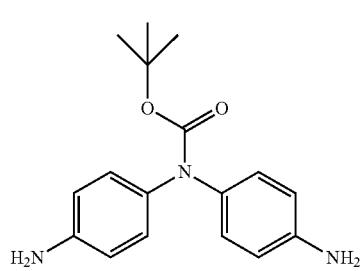
(d-11)
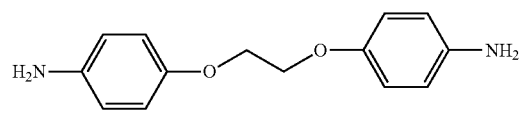
(d-12)
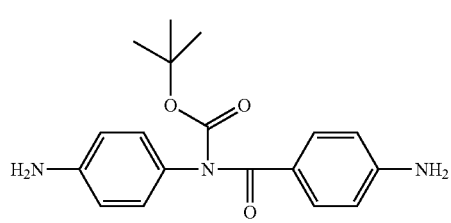
(d-13)
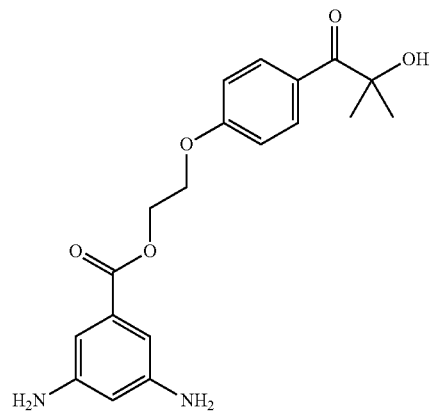
(s-1)
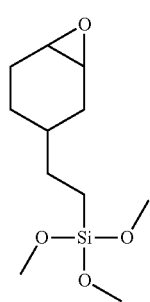
(s-2)
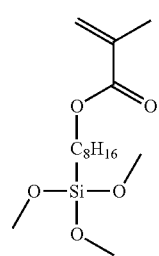

-continued

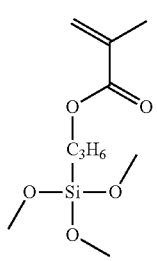
(s-3)

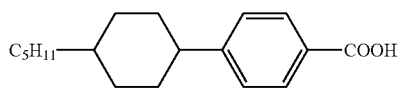
(c-1)

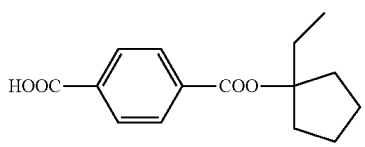
(c-2)

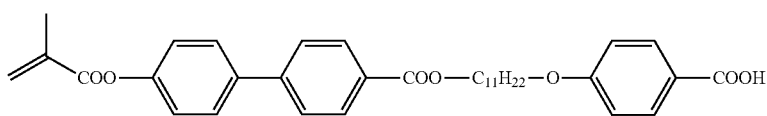
(c-3)

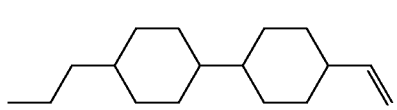
(a-i-1)

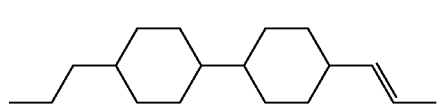
(a-i-2)

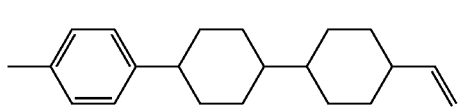
(a-i-3)

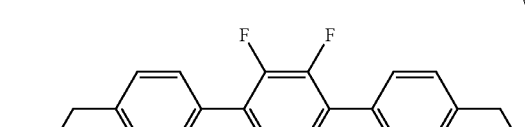
(a-ii-1)

(a-ii-2)

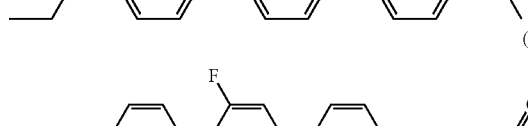
(a-ii-3)

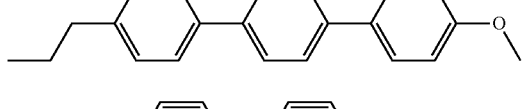
(a-iii-1)

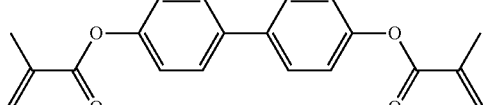

Synthesis of Polymer

Synthesis Example 1

100 parts by mole of 2,3,5-tricarboxycyclopentylacetic acid dianhydride as a tetracarboxylic acid dianhydride, 20 parts by mole of cholestanyloxy-2,4-diaminobenzene as a diamine, 50 parts by mass of 3,5-diaminobenzoic acid and 30 parts by mole of compound (d-8) were dissolved in N-methyl-2-pyrrolidone (NMP), and reaction was carried out at room temperature for 6 hours to obtain a solution containing 20 mass % of polyamic acid. Subsequently, pyridine and acetic anhydride were added to the obtained polyamic acid solution, and chemical imidization was performed. The reaction solution after the chemical imidization was concentrated and the concentration made to be 10 mass % by preparation with NMP. The imidization rate of the obtained polyimide (referred to as polymer (PI-1)) was about 75%.

Synthesis Examples 2 to 4

Polyimides (polymer (PI-2) to polymer (PI-4)) were synthesized in the same manner as Synthesis Example 1 except that the types and amounts of the tetracarboxylic acid dianhydrides and diamines used were changed as shown in Table 1 below.

Synthesis Example 5

70 parts by mole of 2,3,5-tricarboxycyclopentylacetic acid dianhydride as a tetracarboxylic acid dianhydride and 30 parts by mole of 1,2,3,4-cyclopentanetetracarboxylic acid dianhydride as a tetracarboxylic dianhydride, 20 parts by mole of cholestanyloxy-2,4-diaminobenzene, 30 parts by mole of compound (d-12), 40 parts by mole of 4,4'-diaminodiphenylmethane and 10 parts by mole of 4,4'-[4,4'-propane-1,3-diylbis(piperidine-1,4-diyl)]dianiline were dissolved in NMP, and reaction was carried out at room temperature for 6 hours to obtain a solution containing 20 mass % of polyamic acid. The polyamic acid obtained here is referred to as polymer (PAA-1).

Synthesis Example 6

A polyamic acid (referred to as polymer (PAA-2)) was synthesized in the same manner as in Synthesis Example 5 except that the types and amounts of the tetracarboxylic acid dianhydrides and diamines used were changed as shown in the following Table 1.

Synthesis Examples 8 and 9

Polyorganosiloxanes (referred to as polymers (ESSQ-2) and (ESSQ-3)) were synthesized in the same manner as in Synthesis Example 7 except that the type and amount of monomers used were changed as shown in the following Table 2. In Table 2, the numerical values in parentheses represent the proportion [parts by mole] of each compound used with respect to 100 parts by mole of the total amount of monomers used for synthesizing the polymer.

TABLE 1

|  | Polymer name | Acid anhydride 1 | Acid anhydride 2 | Diamine 1 | Diamine 2 | Diamine 3 | Diamine 4 | Imidization rate |
|---|---|---|---|---|---|---|---|---|
| Synthesis Example 1 | PI-1 | t-3 (100) | — | d-6 (20) | d-4 (50) | d-8 (30) | — | 75% |
| Synthesis Example 2 | PI-2 | t-3 (100) | — | d-6 (20) | d-4 (40) | d-8 (30) | d-1 (10) | 82% |
| Synthesis Example 3 | PI-3 | t-4 (100) | — | d-5 (30) | d-7 (20) | d-4 (40) | d-2 (5) | 80% |
| Synthesis Example 4 | PI-4 | t-4 (80) | t-2 (20) | d-13 (50) | d-7 (10) | d-11 (20) | d-10 (20) | 77% |
| Synthesis Example 5 | PAA-1 | t-3 (70) | t-5 (30) | d-6 (20) | d-12 (30) | d-3 (40) | d-2 (10) | 0% |
| Synthesis Example 6 | PAA-2 | t-3 (70) | t-1 (30) | d-6 (20) | d-9 (30) | d-3 (40) | d-2 (10) | 0% |

In Table 1, the numerical values in parentheses for the tetracarboxylic acid dianhydride and the diamine represent the proportion [parts by mole] of each compound used with respect to 100 parts by mole of the total amount of tetracarboxylic acid dianhydride used for the synthesis of the polymer. "-" indicates that the compound in the corresponding column was not used (the same applies to the following).

Synthesis Example 7

100 g of a compound (s-1), 500 g of methyl isobutyl ketone and 10 g of triethylamine were placed in a reaction vessel equipped with a stirrer, a thermometer, a dropping funnel and a reflux condenser, and mixed at room temperature. Subsequently, 100 g of deionized water was added dropwise from the dropping funnel over 30 minutes, and then reaction was carried out at 80° C. for 6 hours while stirring under reflux. After completion of the reaction, the organic layer was taken out and washed with a 0.2 mass %-ammonium nitrate aqueous solution until the water after washing became neutral, and then the solvent and water were distilled off under reduced pressure to obtain reactive polyorganosiloxane (ESSQ-1) as a viscous transparent liquid. As a result of $^1$H-NMR analysis of this reactive polyorganosiloxane, it was determined that a peak based on an epoxy group was obtained in accordance with a theoretical strength in the vicinity of a chemical shift (δ)=3.2 ppm, and a side reaction of the epoxy group did not occur during the reaction. The reactive polyorganosiloxane obtained had a weight average molecular weight Mw of 3000 and an epoxy equivalent of 190 g/mol.

TABLE 2

| Polymer name | Monomers (parts by mole) | |
|---|---|---|
|  | Monomer 1 | Monomer 2 |
| Synthesis Example 7 | ESSQ-1 | s-1 (100) | — |
| Synthesis Example 8 | ESSQ-2 | s-1 (50) | s-3 (50) |
| Synthesis Example 9 | ESSQ-3 | s-1 (50) | s-2 (50) |

Synthesis Example 10

10.0 g of reactive polyorganosiloxane (ESSQ-1), 300 g of methyl isobutyl ketone as a solvent, 16 g of compound (c-1) as a modified component, 16 g of compound (c-3), and 0.10 g of UCAT 18X (trade name, manufactured by SAN-APRO Co., Ltd.) as a catalyst were placed in a 500 mL three-necked flask, and reaction was carried out with stirring at 100° C. for 48 hours. After completion of the reaction, ethyl acetate was added to the reaction mixture, and the resulting solution was washed three times with water, the organic layer was dried with magnesium sulfate, and then the solvent was distilled off to obtain 75 g of polymerizable group-containing polyorganosiloxane (PSQ-1). The weight average molecular weight Mw of the obtained polymer was 6000.

Synthesis Examples 11 and 12

Polymerizable group-containing polyorganosiloxanes (polymers (PSQ-2) and (PSQ-3)) were synthesized in the same manner as in Synthesis Example 10 except that the types and amounts of the reactive polyorganosiloxane and modified components used were changed as shown in the following Table 3. In Table 3, the numerical values in parentheses represent the proportion [parts by mole] of each compound used with respect to 100 parts by mole of the total amount of monomers used for synthesizing the polymer.

TABLE 3

| | Polymer name | ESSQ | Modified components (parts by mole) | |
|---|---|---|---|---|
| | | | Modified component 1 | Modified component 2 |
| Synthesis Example 10 | PSQ-1 | ESSQ-1 | c-1 (20) | c-3 (10) |
| Synthesis Example 11 | PSQ-2 | ESSQ-2 | c-1 (30) | — |
| Synthesis Example 12 | PSQ-3 | ESSQ-3 | c-1 (30) | c-2 (10) |

Preparation of Liquid Crystal Composition

Preparation Example 1

Compound (a-i-1) as an alkenyl compound was added in an amount of 10 mass % based on the total amount of all constituent components of the liquid crystal composition, compound (a-ii-1) as a terphenyl compound was added in an amount of 1 mass % based on the total amount of all constituent components of the liquid crystal composition, and compound (a-iii-1) as a radical polymerizable component was added in an amount of 0.7 mass % based on the total amount of all constituent components of the liquid crystal composition to 10 g of a nematic liquid crystal (MLC-6608, manufactured by Merck & Co., Inc.) and mixing was performed to obtain a liquid crystal composition PLC-1.

Preparation Examples 2 and 3 and Comparative Preparation Examples 1 to 3

Liquid crystal compositions (PLC-2), (PLC-3) and (RLC-1) to (RLC-3) were prepared in the same manner as in Preparation Example 1 except that the type and amount of the alkenyl compound, terphenyl compound and radical polymerizable component used were changed as shown in the following Table 4 below. Further, in Table 4, the numerical values in parentheses represent the proportion [parts by mole] of each compound used with respect to the total amount of the liquid crystal composition. The compound (a-ii-3) is a terphenyl compound but also a radical polymerizable component.

TABLE 4

| | Composition name | Raw material liquid crystal | Alkenyl compound (wt %) | Terphenyl compound (wt %) | Radical polymerizable component (wt %) |
|---|---|---|---|---|---|
| Preparation Example 1 | PLC-1 | MLC-6608 | a-i-1 (10) | a-ii-1 (1) | a-iii-1 (0.7) |
| Preparation Example 2 | PLC-2 | MLC-6608 | a-i-2 (5) a-i-3 (10) | a-ii-1 (2) a-ii-2 (3) | a-iii-1 (1) |
| Preparation Example 3 | PLC-3 | MLC-6608 | a-i-1 (10) a-i-2 (10) a-i-3 (10) | a-ii-1 (10) a-ii-3 (1) | — |
| Comparative Preparation Example 1 | RLC-1 | MLC-6608 | — | — | a-iii-1 (0.5) |
| Comparative Preparation Example 2 | RLC-2 | MLC-6608 | a-i-1 (5) | — | a-iii-1 (0.5) |
| Comparative Preparation Example 3 | RLC-3 | MLC-6608 | — | a-ii-1 (1) | a-iii-1 (0.5) |

Production and Evaluation of Liquid Crystal Display Element

Example 1

(1) Preparation of Liquid Crystal Alignment Agent

The polymer (PSQ-1) was added to a solution containing the polymer (PI-1) as a polymer component such that polymer (PI-1):polymer (PSQ-1) was 95:5 (mass ratio), and NMP and butyl cellosolve (BC) were further added as solvents and sufficiently stirred to prepare a solution having a solvent composition of NMP:BC=50:50 (mass ratio) and a solid content concentration of 6.5 mass % by mass. The solution was filtered through a filter with a pore size of 1 μm to prepare a liquid crystal alignment agent (S-1).

(2) Production of PSA Type-Liquid Crystal Display Element (Evaluation with Bead Spacer)

Figure 2:
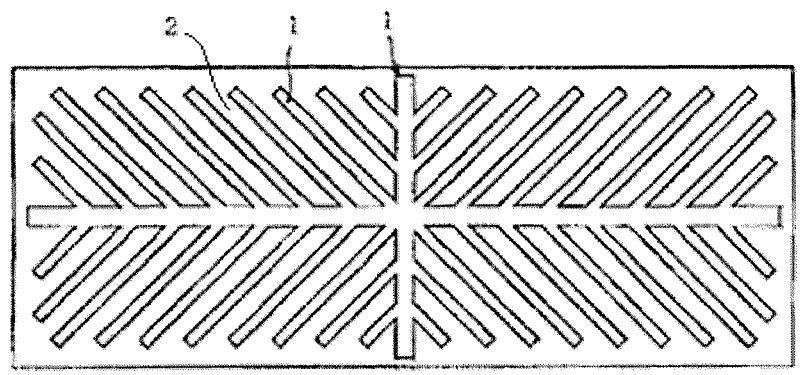
FIG. 2 is a view showing a pattern of a transparent conductive film of a liquid crystal cell used in examples.
Figure 3:
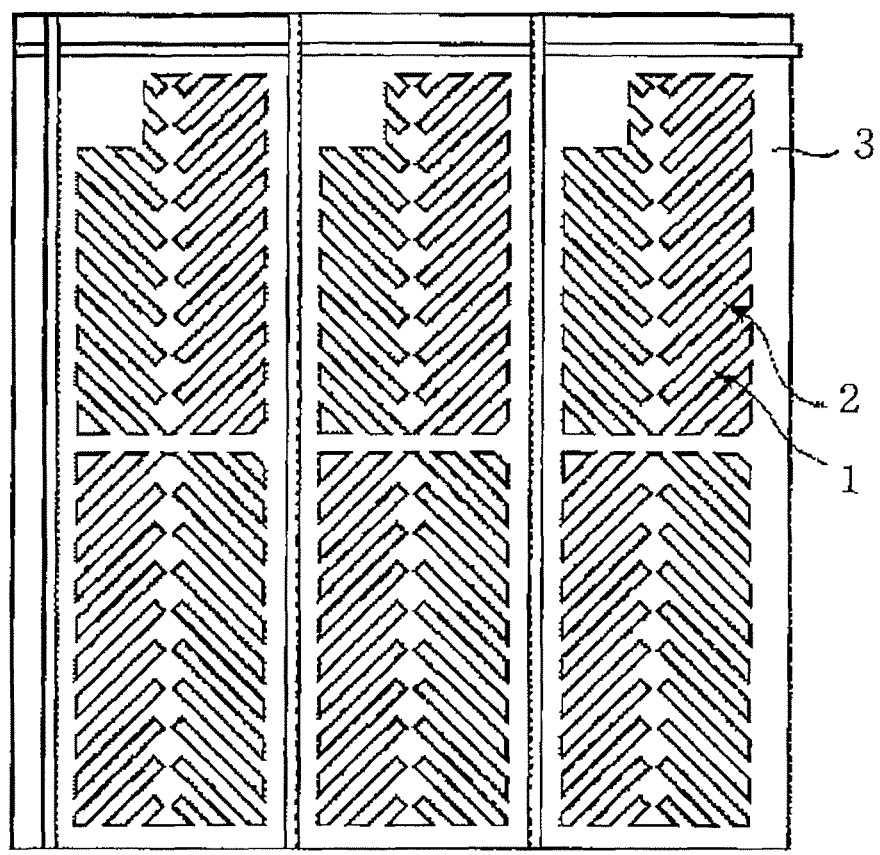
FIG. 3 is a view showing a pattern of a transparent conductive film of a liquid crystal cell used in examples.

Substrates including a glass substrate having an ITO electrode patterned in a fishbone pattern and a glass substrate having an ITO electrode not having a pattern were defined as a pair of substrates and the liquid crystal alignment agent (S-1) prepared above was applied onto each electrode surface of the pair of substrates using a liquid crystal alignment film printing machine (manufactured by Nissha Printing Co., Ltd.). The electrode patterns of the patterned ITO electrodes used here are shown in FIGS. 2 and 3, wherein a transparent conductive film includes an ITO electrode 1, a slit portion 2 and a light shielding film 3. In the present example, a fishbone-shaped electrode pattern in which line/space=3.5 μm/3.5 μm was used. Furthermore, ITO electrodes (electrodes A and B) of two systems capable of separately switching between application/non-application of a voltage were used as the electrodes.

Subsequently, the film was heated (pre-baked) on a hot plate at 80° C. for 1 minute to remove the solvent, and then heated (post-baked) on a hot plate at 230° C. for 15 minutes to form a coating film having an average film thickness of 100 nm. The coating film was subjected to ultrasonic cleaning in ultrapure water for 1 minute and then dried in a 100° C. clean oven for 10 minutes to obtain a substrate having a liquid crystal alignment film. This operation was repeated to obtain a pair of substrates (2 sheets) having a liquid crystal alignment film. Further, the pattern of the electrode used was the same type as the electrode pattern in the PSA mode.

Subsequently, bead spacers (average particle diameter: about 3.5 μm, manufactured by Hayakawa Rubber Co., Ltd.) was sprayed on the surface of one of the substrates having the liquid crystal alignment film, an epoxy resin adhesive containing aluminum oxide spheres having a diameter of 3.5 μm was further applied to each outer edge having the liquid crystal alignment film of the pair of substrates, and then the pair of substrates were overlapped and pressed such that the surfaces having the liquid crystal alignment film faced each other, and the adhesive was cured. Subsequently, the liquid crystal injection port was sealed with an acrylic photocurable adhesive after filling the liquid crystal composition (PLC-1) between the pair of substrates from the liquid crystal injection port. With respect to the obtained liquid crystal cell, an AC voltage of 10 V with a frequency of 60 Hz was applied between the electrodes, and irradiation with ultraviolet rays was performed at an irradiation dose of 100,000 J/m² using an ultraviolet irradiation device using a metal halide lamp as a light source in a state where the liquid crystal was driven. Further, the irradiation dose was a value measured using a photometer measured on the basis of a wavelength of 365 nm.

(3) Evaluation of Afterimage Characteristics

The liquid crystal display element manufactured as described above was placed in an environment of 25° C. and 1 atm, and in the two systems of electrodes, an AC voltage of 10 V and a DC voltage of 0.5 V were applied to the electrode A for 300 hours while no voltage was applied to the electrode B. Immediately after 300 hours had passed, an AC voltage of 3 V was applied to both electrode A and electrode B to measure a difference ΔT [%] in light transmittance between the two electrodes. In this case, the AC afterimage characteristics in a case where ΔT was less than 1.0% was evaluated as "very good (A)," the afterimage characteristics in a case where ΔT was 1.0% or more and less than 2.0% was evaluated as "good (B)," the afterimage characteristics in a case where ΔT was 2.0% or more and less than 3.0% was evaluated as "acceptable (C)," and the afterimage characteristics in a case where ΔT was 3.0% or more was evaluated as "poor (D)." As a result, the evaluation was "good (B)" in this example.

(4) Evaluation of Response Speed of Liquid Crystal

The liquid crystal cell prepared above was sandwiched between two polarizing plates disposed in a crossed Nicols state and irradiated with a visible light lamp first without applying a voltage, and the luminance of the light transmitted through the liquid crystal cell was measured with a photomultimeter, and the measured value was defined as a relative transmittance of 0%. Next, the transmittance when an AC voltage of 5 V was applied between the electrodes of the liquid crystal cell for 5 seconds was measured in the same manner as above, and this value was defined as a relative transmittance of 100%. The time until the relative transmittance shifted from 10% to 90% when an AC voltage of 5 V was applied to each liquid crystal cell was measured, and this time was defined as a response speed. The high speed responsiveness in a case where the response speed was less than 4.0 msec was evaluated as "very good (A)," the high speed responsiveness in a case where the response speed was 4.0 msec or more and less than 5.0 msec was evaluated as "good (B)," the high speed responsiveness in a case where the response speed was 5.0 msec or more and less than 6.0 msec was evaluated as "acceptable (C)," and the high speed responsiveness in a case where the response speed was 6.0 msec or more was evaluated as "poor (D)". As a result, the high speed responsiveness of the liquid crystal cell of the example was "good (B)."

Examples 2 to 6 and Comparative Examples 1 to 5

The liquid crystal alignment agent was prepared in the same manner as in Example 1 except that the types and amounts of the polymer and solvents used were changed as shown in the following Table 5. Furthermore, a liquid crystal display element was manufactured in the same manner as in Example 1 except that the liquid crystal alignment agent and liquid crystal composition used were changed as shown in the following Table 5, and the afterimage characteristics and the response speed were evaluated. The results are shown in the following Table 5.

TABLE 5

| | Alignment agent | | | Liquid crystal composition | Afterimage (ΔT) | | Response speed | |
|---|---|---|---|---|---|---|---|---|
| | Name | Polymer | Solvent composition | Name | ΔT [%] | Determination | Ton (msec) | Determination |
| Example 1 | S-1 | PI-1 (95) PSQ-1 (5) | NMP/BC = 50/50 | PLC-1 | 1.8 | B | 4.2 | B |
| Example 2 | S-2 | PI-2 (95) PSQ-2 (5) | NMP/NEP/BC = 30/20/50 | PLC-2 | 0.6 | A | 3.8 | A |
| Example 3 | S-3 | PI-3 (100) | NMP/DMI/BC = 30/20/50 | PLC-3 | 0.8 | A | 3.6 | A |
| Example 4 | S-4 | PI-4 (100) | NMP/DMI/DEDG = 30/20/50 | PLC-1 | 0.7 | A | 4.3 | B |
| Example 5 | S-5 | PAA-1 (95) PSQ-2 (5) | NMP/DMI/PGDAc = 30/20/50 | PLC-2 | 0.8 | A | 3.9 | A |
| Example 6 | S-6 | PAA-2 (90) PSQ-3 (10) | NMP/BC/DPM = 50/40/10 | PLC-3 | 0.6 | A | 3.7 | A |
| Comparative Example 1 | R-1 | PI-1 (100) | NMP/BC = 50/50 | RLC-1 | 4.5 | D | 7.2 | D |
| Comparative Example 2 | R-2 | PI-3 (100) | NMP/DMI/BC = 30/20/50 | RLC-1 | 2.8 | C | 6.8 | D |
| Comparative Example 3 | R-3 | PI-1 (100) | NMP/BC = 50/50 | PLC-2 | 3.8 | D | 5.8 | C |
| Comparative Example 4 | R-4 | PI-1 (100) | NMP/BC = 50/50 | RLC-2 | 3.6 | D | 5.2 | C |
| Comparative Example 5 | R-5 | PI-1 (100) | NMP/BC = 50/50 | RLC-3 | 3.9 | D | 5.3 | C |

In Table 5, the numerical values in parentheses for the polymer column represent the proportions [parts by mass] of each polymer with respect to 100 parts by mass of the total amount of the polymer components used for preparation of the liquid crystal alignment agent. The numerical values in the solvent composition column represent the proportion [parts by mass] of each compound with respect to 100 parts by mass of the whole solvent used for preparation of the liquid crystal alignment agent (the same applies to the following Table 6).

In Table 5, abbreviations for solvents are as follows (the same applies to the following Table 6).

NEP: N-ethyl-2-pyrrolidone
DMI: 1,3-dimethyl-2-imidazolidinone
DEDG: Diethylene glycol diethyl ether
PGDAc: Propylene glycol diacetate
DPM: dipropylene glycol monomethyl ether Example 7

(1) Preparation of Liquid Crystal Alignment Agent

The polymer (PSQ-2) was added to a solution containing the polymer (PI-2) as a polymer component such that polymer (PI-2):polymer (PSQ-2) was 95:5 (mass ratio), and NMP, N-ethyl-2-pyrrolidone (NEP) and butyl cellosolve (BC) were further added as solvents and sufficiently stirred to prepare a solvent in which a solvent composition of NMP:NEP:BC was 30:20:50, and a solid content concentration was 5.0% by mass. The solution was filtered through a 1 μm pore size filter to prepare a liquid crystal alignment agent (S-7).

(2) Production of PSA Type-Liquid Crystal Display Element (Evaluation with Black Column Spacer)

Substrates including a glass substrate having an ITO electrode patterned in a fishbone pattern and a glass substrate having an ITO electrode not having a pattern in which the electrode side surface of the glass substrate having an ITO electrode not having a pattern had a black column spacer formed using a perylene-based pigment as a light shielding agent were prepared as a pair of substrates. Further, the electrode pattern of the patterned ITO electrode was the same as in Example 1. Furthermore, ITO electrodes of two systems (electrode A and electrode B) capable of separately switching between application/non-application of voltage were used as the electrodes as in the case of Example 1.

The liquid crystal alignment agent (S-7) prepared above was applied to each electrode surface of the pair of substrates with a spinner and then heated (pre-baked) on a hot plate at 80° C. for 1 minute to remove the solvent, and then heated (post-baked) at 230° C. for 15 minutes in a nitrogen-purged oven to form a coating film having an average film thickness of 100 nm. The coating film was subjected to ultrasonic cleaning in ultrapure water for 1 minute and then dried in a clean oven at 100° C. for 10 minutes to obtain a substrate having a liquid crystal alignment film.

Subsequently, the coating film was prebaked on a hot plate at 80° C. for 1 minute and then heated (post-baked) at 230° C. for 15 minutes in a nitrogen-purged oven to form a coating film having an average film thickness of 100 nm. The coating film was subjected to ultrasonic cleaning in ultrapure water for 1 minute and then dried in a clean oven at 100° C. for 10 minutes to obtain a substrate having a liquid crystal alignment film. Further, the pattern of the electrode used was the same type as the electrode pattern in the PSA mode.

Subsequently, after an epoxy resin adhesive was applied to each outer edge of the pair of substrates having the liquid crystal alignment film, the pair of substrates were overlapped and pressed such that the surfaces having the liquid crystal alignment film faced each other, and the adhesive was cured. Subsequently, the liquid crystal injection port was sealed with an acrylic photocurable adhesive after filling the liquid crystal composition (PLC-2) between the pair of substrates from the liquid crystal injection port. With respect to the obtained liquid crystal cell, an AC voltage of 10 V with a frequency of 60 Hz was applied between the electrodes, and irradiation of ultraviolet rays was performed at an irradiation dose of 100,000 J/m$^2$ using an ultraviolet irradiation device using a metal halide lamp as a light source in a state where the liquid crystal was driven. Further, the irradiation dose was a value measured using a photometer measured on the basis of a wavelength of 365 nm.

(3) Evaluation of Afterimage Characteristics and Response Speed

The afterimage characteristics and the response speed were evaluated in the same manner as in Example 1 using the liquid crystal display element manufactured in the above (2). As a result, in the example, the afterimage characteristics were evaluated as "good (B)," and the response speed was evaluated as "good (B)."

Examples 8 and 9 and Comparative Examples 6 to 8

Each of liquid crystal alignment agents were prepared in the same manner as in Example 7 except that the types and amounts of the polymer and solvents used were changed as shown in the following Table 6. Furthermore, a liquid crystal display element was manufactured in the same manner as in Example 7 except that the liquid crystal alignment agent, the composition of the liquid crystal composition, and the composition of the black column spacer used were changed as shown in the following Table 6, and the afterimage characteristics and response speed were evaluated. The results are shown in the following Table 6.

a liquid crystal alignment layer provided on each of the liquid crystal layer sides of the pair of substrates, wherein the liquid crystal layer includes a compound having an alkenyl structure and a compound having a terphenyl ring structure, wherein the compound having an alkenyl structure has a partial structure represented by the following Formula (1):

$$*-A^1-(X^1)_n \qquad (1)$$

where in Formula (1), $A^1$ is an (n+1)-valent alicyclic group, $X^1$ is a group having an alkenyl structure, n is an integer of 1 to 3; and (*) represents a bonding position, wherein the compound having a terphenyl ring structure is at least one compound selected from the group consisting of Formulas (2-1), (2-3) and (2-6) to (2-10):

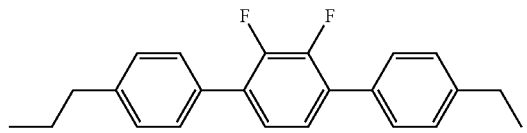

(2-1)

TABLE 6

| | | Alignment agent | | Liquid crystal composition | Spacer composition | Afterimage | | Response speed | |
|---|---|---|---|---|---|---|---|---|---|
| | Name | Polymer | Solvent composition | Name | Name | ΔT [%] | Determination | Ton (msec) | Determination |
| Example 7 | S-7 | PI-2 (95) PSQ-2 (5) | NMP/NEP/BC = 30/20/50 | PLC-2 | BPS-1 | 1.5 | B | 4.5 | B |
| Example 8 | S-8 | PI-3 (100) | NMP/DMI/BC = 30/20/50 | PLC-3 | BPS-2 | 1.1 | B | 4.1 | B |
| Example 9 | S-9 | PI-3 (100) | NMP/DMI/BC = 30/20/50 | PLC-3 | BPS-3 | 0.9 | A | 3.8 | A |
| Comparative Example 6 | R-6 | PI-3 (100) | NMP/DMI/BC = 30/20/50 | RLC-1 | BPS-1 | 4.5 | D | 7.9 | D |
| Comparative Example 7 | R-7 | PI-3 (100) | NMP/DMI/BC = 30/20/50 | RLC-2 | BPS-1 | 4.2 | D | 5.8 | C |
| Comparative Example 8 | R-8 | PI-3 (100) | NMP/DMI/BC = 30/20/50 | RLC-3 | BPS-1 | 4.3 | D | 5.9 | C |

In Table 6, a "spacer composition" indicates that the light shielding agents in the spacer composition used for forming the black column spacer were the following compounds.

BPS-1: perylene-based pigment
BPS-2: mixture of carbon black and Pigment Blue 15:6
BPS-3: mixture of lactam-based pigment and carbon black As is apparent from the results of Tables 5 and 6, when a liquid crystal element has a liquid crystal layer containing an alkenyl compound and a terphenyl compound and has a liquid crystal alignment film formed using a liquid crystal alignment agent containing the polymer (P), the afterimage characteristics and the response speed of the liquid crystal were improved. Furthermore, even when the black column spacer was provided, hardly any afterimages occurred and the response speed of the liquid crystal was high (Examples 7 to 9).

What is claimed is:

1. A liquid crystal element, comprising:
a pair of substrates disposed to face each other;
a liquid crystal layer disposed between the pair of substrates; and -continued

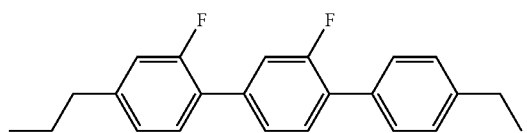

(2-3)

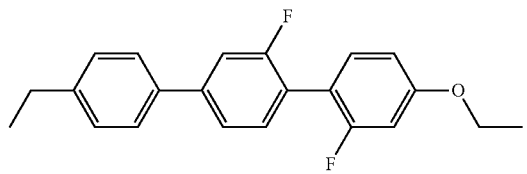

(2-6)

(2-7)
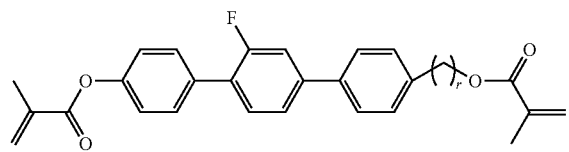

(2-8)
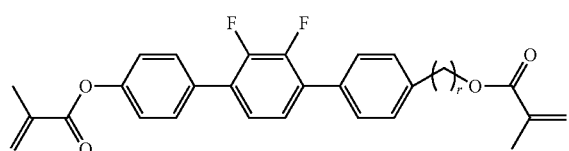

(2-9)
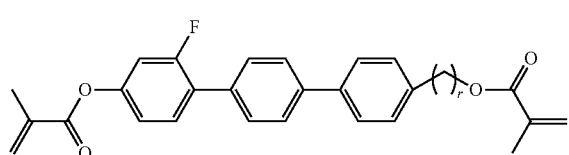

(2-10)
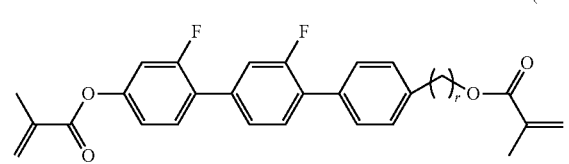

where in Formulas (2-7) to (2-10), r is an integer of 1 or 2, wherein when the compound having a terphenyl ring structure does not include at least one compound selected from the group consisting of Formulas (2-7) to (2-10), the liquid crystal layer further includes a component having a radical polymerizable group that is at least one compound selected from the group consisting of Formulas (2-7) to (2-10), and Formulas (B1-1) to (B1-3):

(2-7)
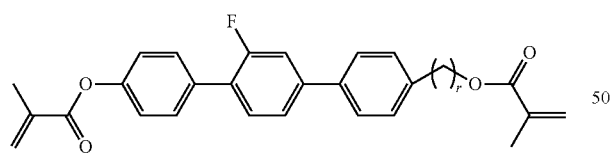

(2-8)
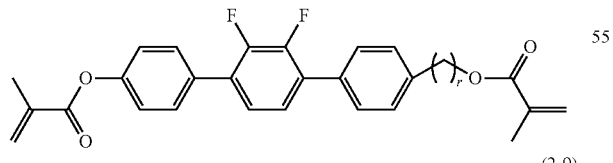

(2-9)
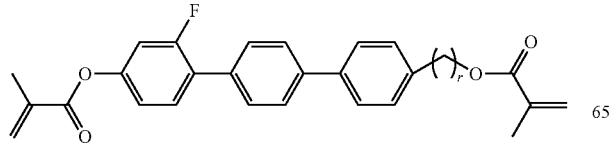

(2-10)
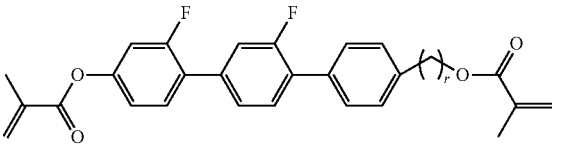

(B1-1)
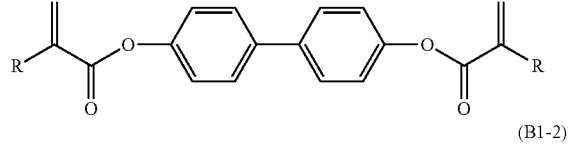

(B1-2)
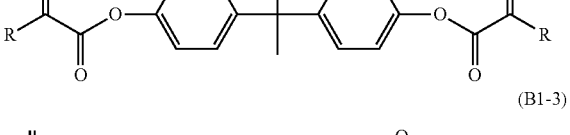

(B1-3)
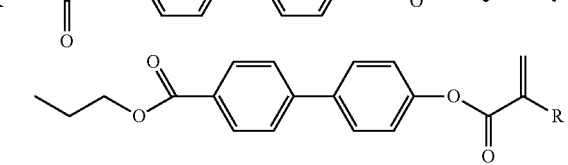

where in Formulas (2-7) to (2-10), r is an integer of 1 or 2, and in Formulas (B1-1) to (B1-3), R represents a hydrogen atom or a methyl group, wherein the liquid crystal alignment layer is a layer comprising a liquid crystal alignment agent containing a polymer (P), wherein the polymer (P) is at least one selected from the group consisting of a polyamic acid, a polyamic acid ester and a polyimide, and the polymer (P) has at least one partial structure selected from the group consisting of a partial structure represented by the following Formula (p-1) and a partial structure represented by the following Formula (p-2):

(p-1)
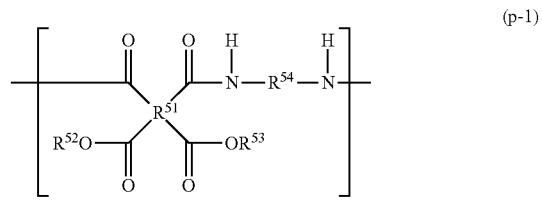

(p-2)
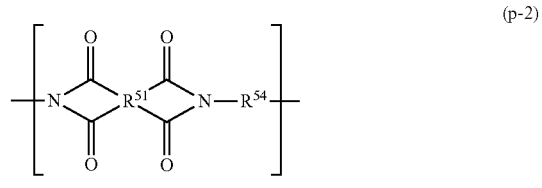

where in Formulas (p-1) and (p-2), $R^{51}$ is a tetravalent organic group, $R^{52}$ and $R^{53}$ each independently represent a hydrogen atom or a monovalent organic group, and $R^{54}$ is a divalent organic group, wherein at least one of $R^{51}$ to $R^{54}$ has at least one group selected from the group consisting of a radical polymerizable group, a photoinitiator group, a nitrogen-containing heterocycle, an amino group and a protected amino group.

2. The liquid crystal element according to claim 1, wherein the polymer (P) is a reaction product of at least one tetracarboxylic acid derivative selected from the group consisting of a tetracarboxylic acid dianhydride, a tetracarboxylic acid diester and a tetracarboxylic acid diester dihalide and a diamine, and
the tetracarboxylic acid derivative has at least one ring structure selected from the group consisting of a cyclobutane ring, a cyclopentane ring and a cyclohexane ring.

3. The liquid crystal element according to claim 1, wherein a black column spacer is provided between the pair of substrates.

4. A method of producing a liquid crystal element, comprising:
applying a liquid crystal alignment agent on a conductive film of a pair of substrates having the conductive film to form a coating film;
forming a liquid crystal cell by arranging the pair of substrates on which the coating film is formed to face each other such that the coating films face each other with a liquid crystal layer interposed therebetween; and
irradiating the liquid crystal cell with light in a state where a voltage is applied between the conductive films,
wherein the liquid crystal layer includes a compound having an alkenyl structure and a compound having a terphenyl ring structure,
wherein the compound having an alkenyl structure has a partial structure represented by the following Formula (1):

$$*-A^1-(X^1)_n \qquad (1)$$

where in Formula (1), $A^1$ is an (n+1)-valent alicyclic group, $X^1$ is a group having an alkenyl structure, n is an integer of 1 to 3; and (*) represents a bonding position,
wherein the compound having a terphenyl ring structure is at least one compound selected from the group consisting of Formulas (2-1), (2-3) and (2-6) to (2-10):

(2-1)

(2-3)
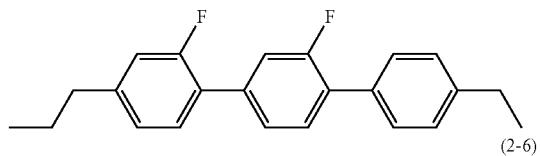

(2-6)
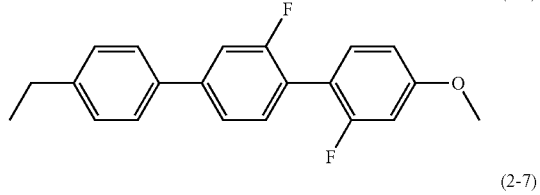

(2-7)
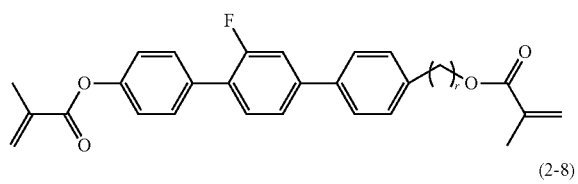

(2-8)
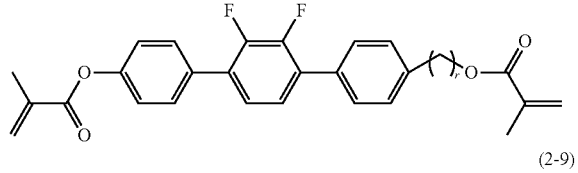

(2-9)
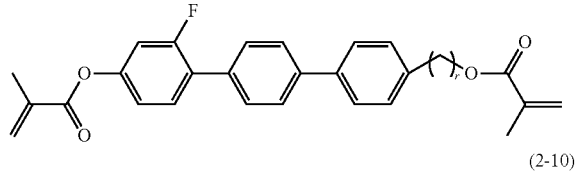

(2-10)
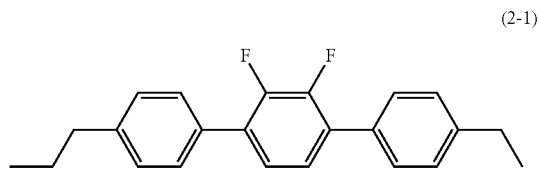

where in Formulas (2-7) to (2-10), r is an integer of 1 or 2,
wherein when the compound having a terphenyl ring structure does not include at least one compound selected from the group consisting of Formulas (2-7) to (2-10), the liquid crystal layer further includes a component having a radical polymerizable group that is at least one compound selected from the group consisting of Formulas (2-7) to (2-10), and Formulas (B1-1) to (B1-3):

(2-7)
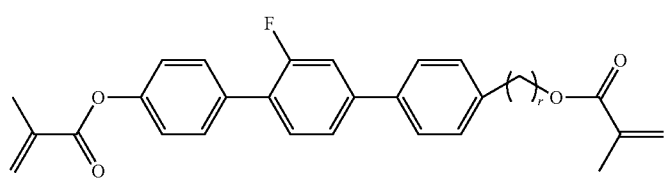

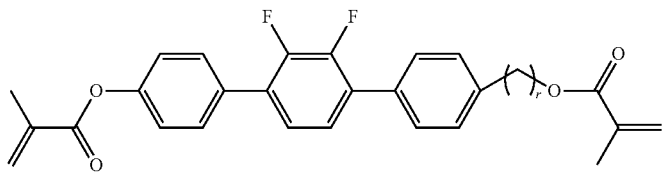
(2-8)

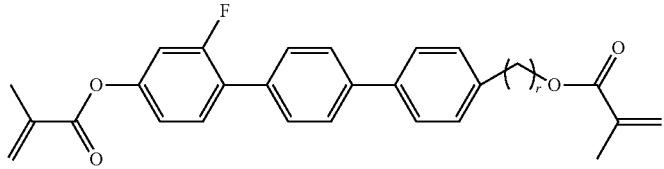
(2-9)

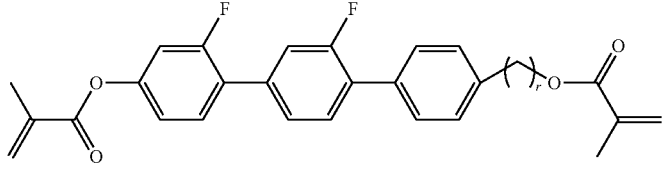
(2-10)

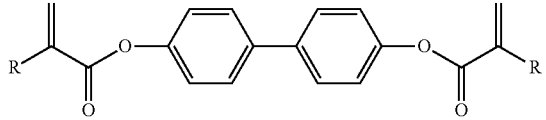
(B1-1)

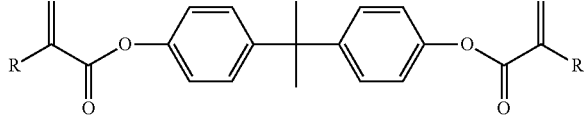
(B1-2)

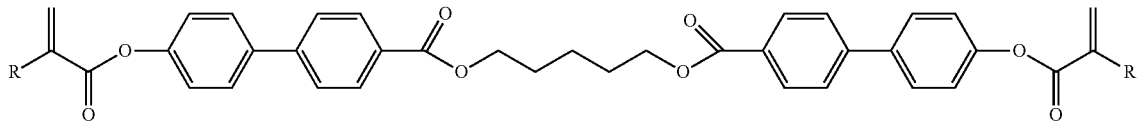
(B1-3)

where in Formulas (2-7) to (2-10), r is an integer of 1 or 2, and in Formulas (B1-1) to (B1-3), R represents a hydrogen atom or a methyl group, wherein the liquid crystal alignment agent contains a polymer (P), wherein the polymer (P) is at least one selected from the group consisting of a polyamic acid, a polyamic acid ester and a polyimide, and the polymer (P) has at least one partial structure selected from the group consisting of a partial structure represented by the following Formula (p-1) and a partial structure represented by the following Formula (p-2):

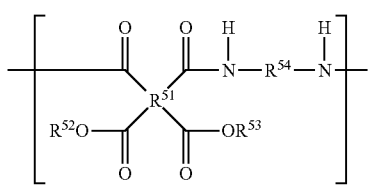
(p-1)

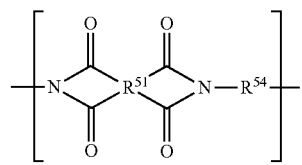
(p-2)

where in Formulas (p-1) and (p-2), $R^{51}$ is a tetravalent organic group, $R^{52}$ and $R^{53}$ each independently represent a hydrogen atom or a monovalent organic group, and $R^{54}$ is a divalent organic group, wherein at least one of $R^{51}$ to $R^{54}$ has at least one group selected from the group consisting of a radical polymerizable group, a photoinitiator group, a nitrogen-containing heterocycle, an amino group and a protected amino group.

* * * * *